United States Patent [19]

Willard

[11] 3,978,454
[45] Aug. 31, 1976

[54] SYSTEM AND METHOD FOR PROGRAMMABLE SEQUENCE CONTROL

[75] Inventor: Frank G. Willard, Monroeville, Pa.

[73] Assignee: Westinghouse Electric Corporation, Pittsburgh, Pa.

[22] Filed: June 20, 1974

[21] Appl. No.: 481,267

[52] U.S. Cl. .......................................... 340/172.5
[51] Int. Cl.² .................. G06F 9/16; G06F 13/08; G05B 11/32; G05B 19/24
[58] Field of Search ................... 445/1; 340/172.5; 235/151

[56] References Cited
UNITED STATES PATENTS

| | | | |
|---|---|---|---|
| 3,514,758 | 5/1970 | Bennett | 340/172.5 |
| 3,585,603 | 6/1971 | Ross et al. | 340/172.5 |
| 3,651,482 | 3/1972 | Benson | 340/172.5 |
| 3,701,113 | 10/1972 | Chace et al. | 340/172.5 |
| 3,707,703 | 12/1972 | Sakai | 340/172.5 |
| 3,719,931 | 3/1973 | Schroeder | 340/172.5 |
| 3,741,246 | 6/1973 | Brantenbah | 340/172.5 X |
| 3,753,243 | 8/1973 | Ricketts et al. | 340/172.5 |
| 3,763,474 | 10/1973 | Freeman et al. | 340/172.5 |
| 3,764,995 | 10/1973 | Helf et al. | 340/172.5 |
| 3,783,251 | 1/1974 | Pavkovich | 340/172.5 X |
| 3,825,901 | 7/1974 | Golnek et al. | 340/172.5 |
| 3,875,391 | 4/1975 | Shapiro et al. | 340/172.5 |

OTHER PUBLICATIONS

"Programmable Logic Controllers—An Update", N. Andreiev *Control Engineering*, Sept. 1972, pp. 45-47.

"Programmable Logic Controllers—Painless Programming to Replace the Relay Bank", G. Lapidus, *Control Engineering*, Apr. 1971, pp. 49-60.

*Primary Examiner*—Gareth D. Shaw
*Assistant Examiner*—Jan E. Rhoads
*Attorney, Agent, or Firm*—C. M. Lorin

[57] ABSTRACT

A programmable sequence controller for controlling a machine or process operation including a main low-security programmed sequencer and a high-security programmed sequencer through which selected outputs from the main sequencer must pass before being allowed to control the machine or process operation. This high-security sequencer generates a sequence of steps which relate to machine or process commands under conditions critical to the operation of the machine or process and is controlled in a predetermined order. Any critical output requested by the main sequencer is caused to initiate sequencing by the high-security sequencer and is tested by the high-security sequencer as to the propriety of the generation of a permitted output to the machine or process. The high-security sequencer in this manner effects an improved interlocking between the various critical output commands and actual operative conditions.

6 Claims, 24 Drawing Figures

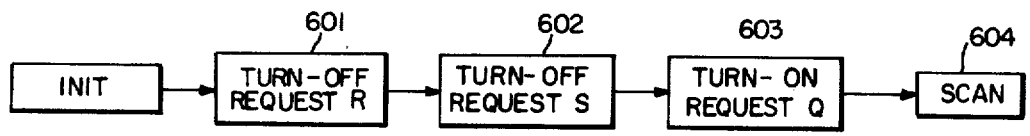
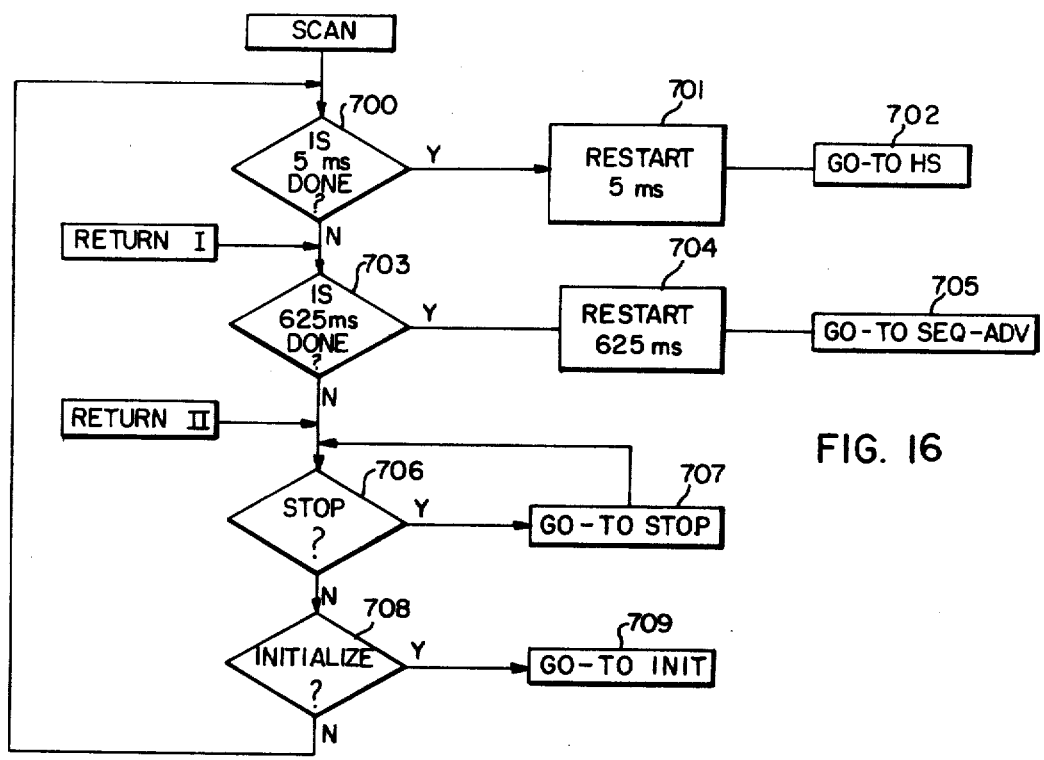
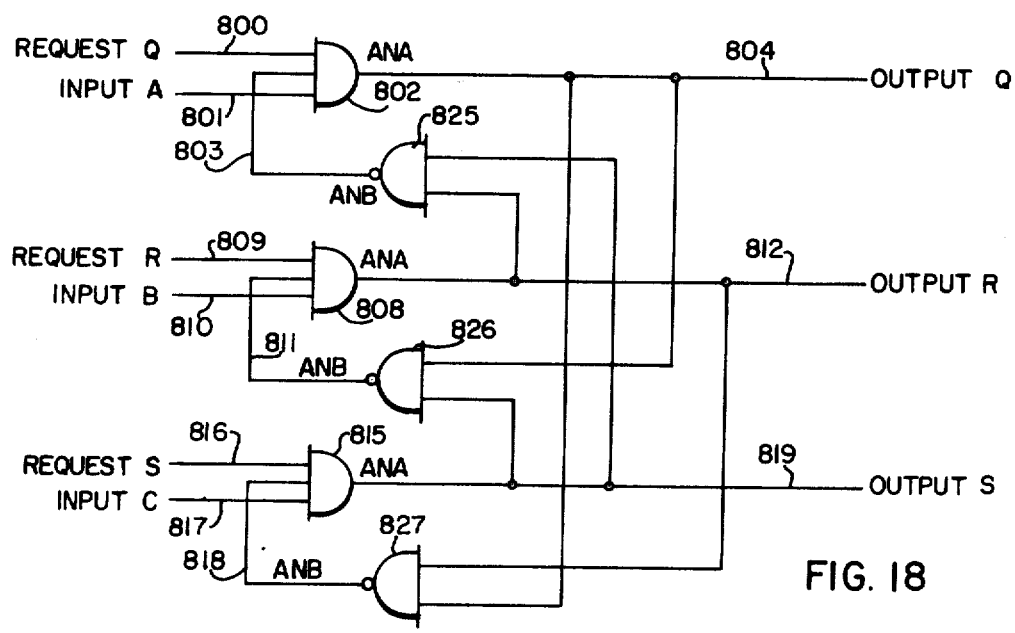

SEQUENCE ADVANCE PROGRAM (Continued)

| MEMORY LOCATION | INSTRUCTION | | | REMARKS |
|---|---|---|---|---|
| | F | Y | Z | |
| 75 | | | | (Left blank for future additions) |
| 76 | | | | |
| 77 | | | | |
| 78 | | | | |
| 79 | ØFA | TEMP | 0 | (See remarks for memory locations 55 to 62 |
| 80 | ØFA | REQUEST S | 0 | |
| 81 | IFY | MODE I | 1 | |
| 82 *| JMP | 85 | | |
| 83 | ØFA | REQUEST R | 1 | |
| 84 | SRR | | | |
| 85 | ØFA | REQUEST Q | 1 | |
| 86 | SRR | | | |
| (End of LS Programs) | | | | * = JMP or JSR instruction address (i.e. binary number number in Y field of instruction) is lower by one than value actually shown. Nevertheless, next instruction actually executed is found at location shown. |

FIG. 21B

INITIATE PROGRAM

| MEMORY LOCATION | INSTRUCTION | | | REMARKS |
|---|---|---|---|---|
| | F | Y | Z | |
| 0 | ØFA | TEMP | 0 | TEMP is an unused data memory location (used to reset logic flip-flops A to H) |
| 1 | ØFA | REQUEST R | 0 | Clears REQUEST R in data memory |
| 2 | ØFA | REQUEST S | 0 | Clears REQUEST S in data memory |
| 3 | ØFA | REQUEST Q | 1 | Sets REQUEST Q in data memory |

FIG. 19

SCAN PROGRAM

| MEMORY LOCATION | INSTRUCTION | | | REMARKS |
|---|---|---|---|---|
| | F | Y | Z | |
| 4 | IFY | 5 ms | 0 | If 5 ms timer has timed out, take next instruction |
| 5 * | JMP | 20 | | Jump to 20 (i.e. Reset 5 ms and do outputs) |
| 6 | IFY | 625 ms | 0 | If 625 ms timer has timed out, take next instruction |
| 7 * | JMP | 27 | | |
| 8 | IFY | STOP | 1 | If STOP input is TRUE, take next instruction |
| 9 * | JMP | 8 | | Jump to memory location 8 (i.e. loop) |
| 10 | IFY | INIT | 1 | If INIT input is TRUE, take next instruction |
| 11 * | JMP | 0 | | Jump to memory location 0 (i.e. INIT Program) |
| 12 * | JMP | 4 | | Jump to beginning of SCAN |
| 13 | | | | |
| 14 | | | | |
| 15 | | | | (Left blank to permit eventual addition of more SCAN questions, if desired) |
| 16 | | | | |
| 17 | | | | |
| 18 | | | | |
| 19 | | | | |
| 20 | ØFA | TEMP | 0 | (Same remark as memory location 0) |
| 21 | ØFA | 5 ms | 1 | Retriggers 5 ms timer |
| 22 * | JSR | 2048 | | Enter HS Program |
| 23 * | JMP | 6 | | Return from HS Program to SCAN Program |
| 24 | | | | |
| 25 | | | | (Left blank for possible future additions) |
| 26 | | | | |
| 27 | ØFA | TEMP | 0 | (Same remark as memory location 0) |
| 28 | ØFA | 625 ms | 1 | Retriggers 625 ms timer |
| 29 * | JSR | 40 | | Enter SEQUENCE ADVANCE Program |
| 30 * | JMP | 8 | | Return from SEQUENCE ADVANCE Program to SCAN Program |
| 31 | | | | |
| 32 | | | | |
| 33 | | | | |
| 34 | | | | |
| 35 | | | | (Left blank for possible future additions) |
| 36 | | | | |
| 37 | | | | |
| 38 | | | | |
| 39 | | | | |

FIG. 20

SEQUENCE ADVANCE PROGRAM

| MEMORY LOCATION | INSTRUCTION | | | REMARKS |
|---|---|---|---|---|
| | F | Y | Z | |
| 40 | IFY | Q | 1 | Tests Output Q via feedback from input module |
| 41 * | JMP | 55 | | Jump to 55 to handle top line on sequence |
| 42 | IFY | R | 1 | Tests Output R via feedback from input module |
| 43 * | JMP | | | |
| 44 | IFY | S | 1 | Tests Output S via feedback from input module |
| 45 * | JMP | | | |
| 46 | ØFA | TEMP | 0 | (Same remark as memory location 0) |
| 47 | ØFA | REQUEST Q | 1 | (All outputs Q, R, S ON is not |
| 48 | ØFA | REQUEST R | 1 | permitted but HS program protects |
| 49 | ØFA | REQUEST S | 1 | against this situation) |
| 50 | SRR | | | |
| 51 | | | | |
| 52 | | | | (Left blank for future additions) |
| 53 | | | | |
| 54 | | | | |
| 55 | ØFA | TEMP | 0 | (Same remarks as memory location 0) |
| 56 | ØFA | REQUEST Q | 0 | Turn-off REQUEST Q in data memory |
| 57 | IFY | MODE I | 1 | Test MODE I input |
| 58 * | JMP | 61 | | Jump to 61; MODE I is True |
| 59 | ØFA | REQUEST S | 1 | MODE I is False, ∴ turn on S |
| 60 | SRR | | | |
| 61 | ØFA | REQUEST R | 1 | MODE I is True, ∴ turn on R |
| 62 | SRR | | | |
| 63 | | | | |
| 64 | | | | |
| 65 | | | | (Left blank for future additions) |
| 66 | | | | |
| 67 | ØFA | TEMP | 0 | |
| 68 | ØFA | REQUEST R | 0 | |
| 69 | IFY | MODE I | 1 | |
| 70 * | JMP | 73 | | (See remarks for memory |
| 71 | ØFA | REQUEST Q | 1 | locations 55 to 62) |
| 72 | SRR | | | |
| 73 | ØFA | REQUEST S | 1 | |
| 74 | SRR | | | |

FIG. 21A

HS PROGRAM

| MEMORY LOCATION | INSTRUCTION ||| REMARKS |
|---|---|---|---|---|
| | F | Y | Z | |
| 1  2048 | ANB | S | 1 | And to flip-flop B the value of S (i.e. I/O), True |
|    2049 | ANB | R | 1 | And to flip-flop B the value of R (i.e. I/O), True |
| 2  2050 | ANA | REQUEST Q | 1 | And to flip-flop A the value of data memory Request Q, True |
|    2051 | ANA | B | 0 | And to flip-flop A the value of flip-flop B, complemented |
|    2052 | ANA | INPUT A | 1 | And to flip-flop A the value of Input A, True |
|    2053 | ØFA | OUTPUT Q | 1 | Output to Q |
| 3  2054 | ANB | Q | 1 | |
|    2055 | ANB | S | 1 | |
| 4  2056 | ANA | REQUEST R | 1 | |
|    2057 | ANA | B | 0 | |
|    2058 | ANA | INPUT B | 1 | (From 2054 to 2065 same remarks as from |
|    2059 | ØFA | OUTPUT R | 1 | 2048 to 2053 with corresponding requested |
| 5  2060 | ANB | R | 1 | outputs and inputs, for R and S) |
|    2061 | ANB | Q | 1 | |
| 6  2062 | ANA | REQUEST S | 1 | |
|    2063 | ANA | B | 0 | |
|    2064 | ANA | INPUT C | 1 | |
|    2065 | ØFA | OUTPUT S | 1 | |
|    2066 | SRR | | | (Return) |

FIG. 22

SYSTEM AND METHOD FOR PROGRAMMABLE SEQUENCE CONTROL

BACKGROUND OF THE INVENTION

The invention relates to programmable sequence control operation for machines, and processes such as industrial machines or processes and it relates more particularly to high-security programmable sequence control apparatus, systems and methods.

It is known to control an industrial process sequentially, e.g. to cause the performance of a series of machine functions or process operations such that some of the steps will not be performed unless a predetermined event, which can be an earlier step, has occurred. Sequential control can be achieved with a stored set of program instructions successively read out and executed, and such control requires that at times these instructions provide for jumping, or branching out of the succession. Sequence controllers are well known, and an overview of the state of the prior art can be found in "Programmable Logic Controllers — an Update" by N. Andreiev in Control Engineering of September, 1972, pages 45–47 and in "Programmable Logic Controllers-Painless Programming to Replace The Relay Bank" by G. Lapidus in Control Engineering of April 1971, pages 49–60. If the memory is programmable, a given hardware apparatus can be instantly adapted to fit a particular industrial process. Sequence controllers can be hard-wired, or they may use software coordinating logic elements used for decision and control. In a digital controller, conversation between the functional units is accomplished essentially by binary logic according to Boolean algebra. As a result of such logic steps, a logic decision is taken involving input conditions and output commands which admit of only two opposite states such as yes or no, do or do not, true or false, on or off. These states pertain for instance to limit switches, relay, valves or other such two-state power devices which are associated with the controlled process. A sequence controller can establish a predetermined sequence of outputs, each in one of two states, which is used to control a machine or a process and in this respect a sequence controller is distinguishable from other control systems which perfom data handling, logging or monitoring functions. The latter are generally associated with more complex control systems involving computation of data such as found in adaptive process control, for instance.

In contrast, a rather simple structural organization is practical with sequence controllers, although sequence controllers may be found also within more complex control systems, particularly in digital computer systems. As a result of this relative conceptual simplicity, efforts have been made in the past to reduce the structural combination to that essential for cost reduction and increased reliability. This trend is better represented by a combination of read-only-memory (ROM) units and a software translation, with coded instructions stored therein, of the logic coordination of the input and output signal units. Still, versatility and reliability demand a certain degree of comlexity which must be attained at the lowest cost as well as within the constraints of the simple basic structure of a sequence controller e.g. a short word length, a limited capacity for the memory, and, as a result, the availability of only a few elementary instructions.

Among the requirements which need to be satisfied for the control of a real time process operation, an important requirement is the necessity of preventing any output command from being translated into process operation unless it is safe and desired to do so. A particular and critical control step can be unsafe to the human operator, or it may represent a risk of damage to the machinery, and equipment or the processed material. All such conditions must be anticipated and the logic of control by the sequence controller should take them into account so that only permissible output commands are provided.

As generally known, programmable logic controllers are designed to perform sequencing operations by first scanning signal inputs such as from relay contacts, limit switches, pushbuttons, valves, etc., then comparing the inputs to the conditions specified in the program and finally be energizing or deenergizing signal outputs in accordance with the programmed instructions. See in this respect "Programmable Logic Controllers" by G. Lapidus, Control Engineering, April 1971, pages 49–60.

It is known also in a programmed sequence controller to advance the control steps when machine functions, or process operations at a given step are matched with a pattern of input conditions. In particular, the prior art proposes logical interlocks to inhibit certain output signal functions in the programmed sequence until certain other input signal functions have been accomplished, and to this effect hardwiring is provided between input conditions sensed and an AND logic operation responsive to the output function to be abled or disabled. Seen in this regard U.S. Pat. No. 3,719,931 of R. L. Schroeder issued Mar. 6, 1973.

The prior art also shows that in sequence control apparatus is advantageous to use a programmable matrix of logic elements, rather than hard-wired logic, in order to modify the sequence of the control operations. See for instance, French Pat. No. 1,493,229 granted July 17, 1967 of Siemens and Halske A. G.

However, none of the above references is teaching the use of a separate high-security sequencer having selected outputs so interlocked that the propriety of outputs requested by the base programmed matrix of the controller is tested before enabling an actual ouput command, which is one important feature of the apparatus, system and method according to the present invention.

The prior art also shows two sequencers interlocked by an AND logic element to make them operate in dependency upon each other. See in this respect U.S. Pat. No. 3,651,482 of Benson issued Mar. 21, 1972. However, the sequencers disclosed in the Benson Patent are operating in parallel within a common processor and interlocking does not occur in one of them.

It is also known from the U.S. Pat. No. 3,783,251 of T. M. Pavkovich issued Jan. 1, 1974 to use two programs in digital automatic control, one program having stored predetermined critical characteristics which are compared at all times with the operative characteristics imposed by the other program so that when a mismatch occurs an interlocking signal is generated to stop the process or the machinery. Thus, one program generates a representation of all the critical parameters not to be exceeded for safe control and it monitors actual operation by the other program in order to detect any operation approaching criticality. In contrast, the present invention teaches the use of a separate high-security program having inherently safe control characteristics, and the base program does not actually exert control on the machine or process in relation to critical output functions unless the instructions to be performed have been effectively taken over by the high-security program. In addition, the present invention rather than stopping the entire operation of the process or machinery, proposes effective control operation in a prescribed and predetermined safe sequential order.

It is an object of the present invention to provide a sequence controller which is free from the prior art disadvantages and inconveniences.

Another object of the present invention is to provide a sequence controller of simple design but increased versatility.

Still another object of the present invention is to provide a sequence controller having selectable high-security features for application to control of machines and processes.

SUMMARY OF THE INVENTION

The invention resides in a programmable sequence controller apparatus for generating output commands to a controlled machine or process. The apparatus generates a main low-security programmed sequence of requested output signals and a high-security programmed sequence of permitted output signals initiated by said main programmed sequence for establishing with selected critical ones of said requested output signals said predetermined sequence of permitted output signals in relation to process requirements due, and means are provided gated for generating actual output commands in response to said permitted output signals when said process requirements are met.

The invention also resides in a method of establishing sequential output commands to a machine or process operation and comprising the steps of: generating a programmed sequence of requested output signals; generating a programmed sequence of permitted output signals in accordance with predetermined testing conditions and with at least selected critical ones of said requested outputs and controlling said process by said permitted output signals.

The invention further resides in a modular system for sequentially controlling a machine or process operation including a program memory module, a controller module, an output module, an input module and a bus system for functionally interconnecting said modules. The programm memory module includes a main set of stored instructions and a separate high-security set of stored instructions. The controller module is responsive to the main set of instructions for establishing a sequence of requested output signals and is further responsive to said high-security set of instructions for establishing permitted output signals in response to selected critical ones of said requested output signals and in relation to process requirement due. The process requirements are sensed and translated into digital input signals. The output module is inhibited when the controller module is operative under critical requested outputs from the main set of instructions, but generates actual output signals in response to said permitted output signals.

BRIEF DESCRIPTION OF THE DRAWINGS

FIG. 15 shows a logic flow chart of an illustrative low-security initiate operation identified as INIT;

FIG. 16 shows a flow chart of an illustrative low-security main program SCAN operation;

FIG. 18 shows a logic representation of an illustrative HIGH SECURITY program operation;

FIG. 19 is an illustrative instruction listing for the INIT program flow chart of FIG. 15;

FIG. 20 is an illustrative instruction listing for the SCAN program of FIG. 16;

FIGS. 21A and 21B are an illustrative instruction listing for the SEQUENCE ADVANCE program of FIG. 17;

FIG. 22 is an illustrative instruction listing for the HIGH SECURITY program of FIG. 18.

DESCRIPTION OF THE PREFERRED EMBODIMENT

Figure 1:
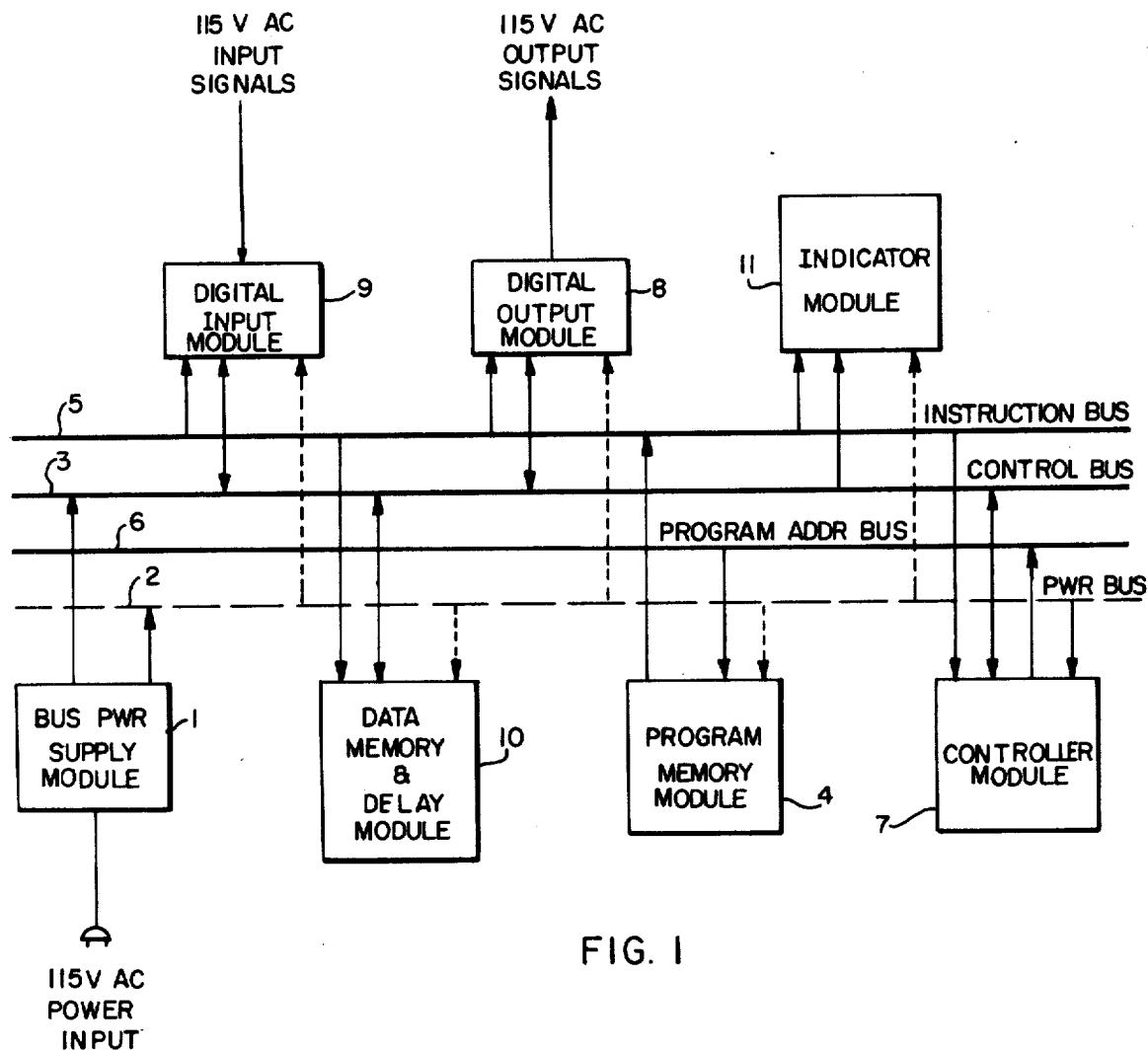
FIG. 1 represents an overall view of the organization of the process sequential control system according to the present invention.

Referring to FIG. 1 of the drawings, the overall organization of the sequence control operation according to the present invention is shown as a combination of several functional units in modular form arranged around a bus system comprising: an instruction bus, a control bus, a program address bus and a power bus. Although reference is made to one bus for each of the connecting functions, it is well understood that each bus in reality connects on both sides a plurality of conductors associated with various information data to be transferred between the different modules, with the exception, however, of the power bus since the latter does not carry information but is used only for the supply and transport of electrical energy from the power supply to the respective modules.

As shown in FIG. 1 the functional units include: a bus power supply module 1 connected to the power bus 2 and the control bus 3; a program memory module 4 having connections to the instruction bus 5 and the program address bus 6; a controller module 7 connected to the instruction bus 5 and also to the program address bus 6; a digital output module 8 operative with the control bus 3, the program address bus 6 and the instruction bus 5; a digital input module 9 operative with the control bus 3, program address bus 6 and instruction bus 5. The sequential control apparatus is also provided with a data memory and delay module 10 connected to the control bus 3 and the instruction bus 5, and an indicator module 11 operative with the control bus 3 and the instruction bus 5. It should be observed that the power bus 2 is operative with each of the modules, as well as the bus power supply module 1. Each of the above modules will be described structurally and functionally hereinafter in relation to other figures of the drawings.

As generally known, the controller module 7 responds to instructions from the program memory 4 received over the instruction bus 5, and determines the sequence of instructions to be addressed within the program memory 4. Thus at any given instant, over the program address bus 6, an instruction address is sent by the controller module 7 and a corresponding location is selected within the program memory 4. After selection an instruction is read out from the particular location in the memory 4 and transferred over instruction bus 5, to be executed. Execution by the controller module 7 may consist in performing another address selection or it may involve some datum derived from the digital input module 9, or from the data memory and delay module 10. Execution of the instruction by the controller module 7 may require the generation of an output command by the digital output module 8, to the outside world e.g., the controlled process. The indicator module 11 may provide at any given time a visual representation of process operation and of control conditions. For instance, two sets of indicators such as described in the above referenced U.S. Pat. No. 3,719,931 of Schroeber may be provided, if desired, which when matching would indicate a proper correspondence between conditions required and conditions due, and in case of a mismatch the operator would be alerted.

The controller module 7 will now be described to show some important features of the sequence control device according to the present invention. The program memory module 4 will be described subsequently in order to emphasize some other important features of the controller module 7.

A. — THE CONTROLLER MODULE

Figure 2:
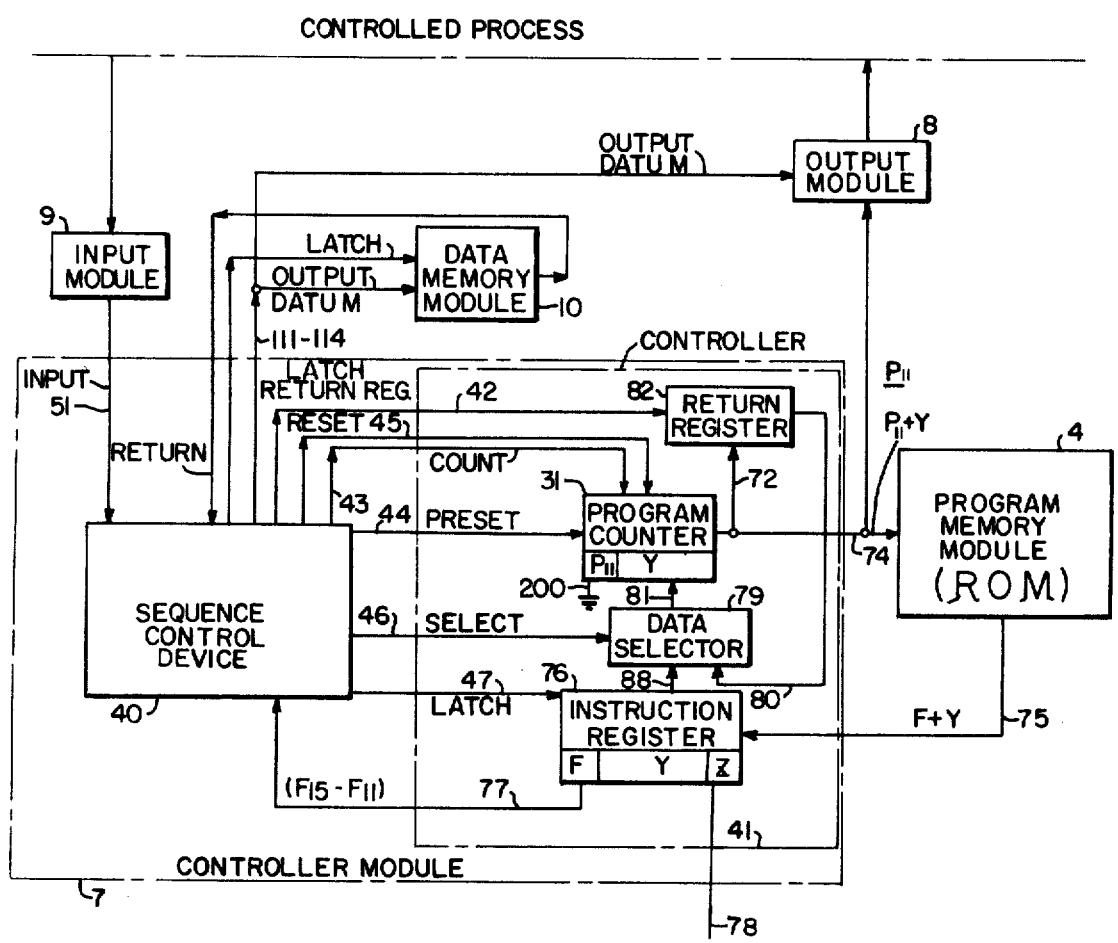
FIG. 2 is a block diagram of the sequence controller apparatus according to the present invention showing the sequence control device and the controller which together form the controller module in the preferred embodiment of the present invention.

FIG. 2 schematically represents the operational relationships between the controller module 7 and the other modules of the sequence control apparatus according to a preferred embodiment of the present invention. The controller module 7 includes two parts: a sequence control device 40 and a controller 41. The controller 41 will be considered separately, as well as in the combination with the program memory module 4, or the other functional units of the sequence control apparatus, including the sequence control device 40.

Figure 3:
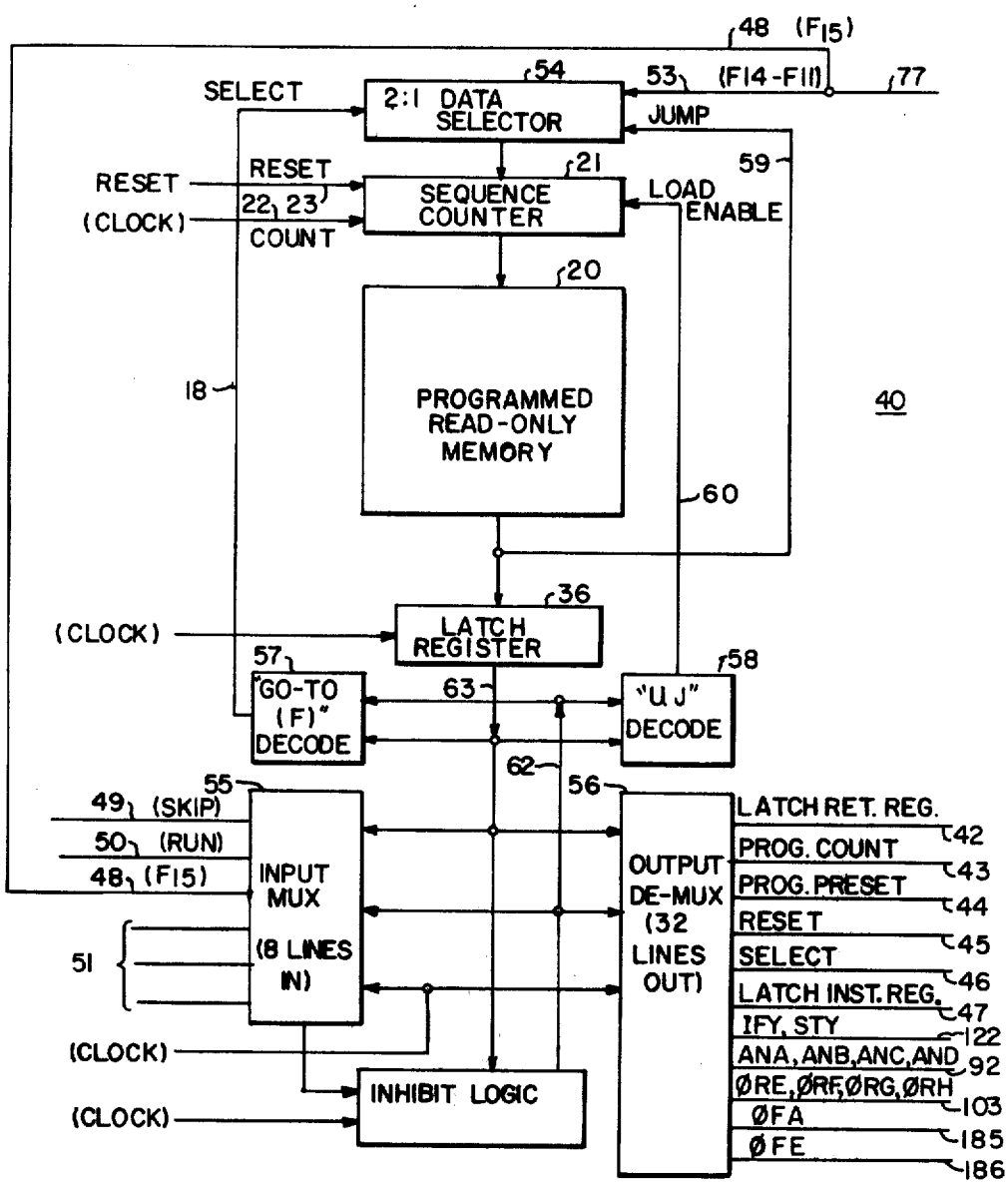
FIG. 3 shows the general organization of the sequence control device of FIG. 2.

The purpose of the sequence control device 40 is to add sophistication in the operation of the controller 41. The sequence control device 40 will be described first, especially to the extent of the generation of subroutine sequences involving control commands to the controller 41, namely, and as shown in FIGS. 2 and 3. signals for the latch return resister program, count program, preset (or jump), reset, select, and latch instruction register, which signals are derived on lines 42–47, respectively. Such control operations are determined by the sequence control device 40 in response to input condition signals appearing on lines 48–51 (shown in FIG. 3) which pertain to respective coded signals such as F15, skip, run, and other signals defined in the operation process which may be generated within the controller module 7 or by some other input source. Operation of the sequence control device 40 is determined in response to a coded instruction of five bits F15–F11. This is the operation field of an instruction derived on line 75 from program memory module 4. Bits F14–F11 are inputted along line 53 (shown in FIG. 3) while another line 48 is provided as an input within the sequence control device 40 for the last bit F15. Program memory module 4 has stored therein instructions which are 16 bits long. These include at least two parts as shown herebelow in Table I: an operation field of five bits and an address field of ten bits. Besides, instructions 4 to 15 include a Z field of one bit. The following Table I illustrates 24 different types of instruction which are stored in the program memory module 4.

TABLE I

| Mnemonic | | Instruction Coding | | Time μs | Name of Instruction |
|---|---|---|---|---|---|
| 0 | NϕB | 00000 | (not defined) | 7 | No-Operation; Blank |
| 1 | SRR | 00001 | (not defined) | 9 | Sub-Routine Return |
| 2 | JMP | 00010 | Jump Addr. Y | 9 | JUMP, unconditionally |
| 3 | JSR | 00011 | Jump Addr. Y | 11 | JUMP to Sub-Routine |
| 4 | IFY | 00100 | In. Addr. Y  Z | 8 | IF (Y) ≠ Z, skip next instr. |
| 5 | STY | 00101 | In. Addr. Y  Z | 9 | STOP if (Y) = Z |
| 6 | ϕFA | 00110 | Out. Addr. Y  Z | 9 | Output From A |
| 7 | ϕFE | 00111 | Out. Addr. Y  Z | 9 | Output from E |
| 8 | ANA | 01000 | In. Addr. Y  Z | 8 | AND to A |
| 9 | ANB | 01001 | In. Addr. Y  Z | 8 | AND to B |
| 10 | ANC | 01010 | In. Addr. Y  Z | 8 | AND to C |
| 11 | AND | 01011 | In. Addr. Y  Z | 8 | AND to D |
| 12 | ϕRE | 01100 | In. Addr. Y  Z | 8 | OR to E |
| 13 | ϕRF | 01101 | In. Addr. Y  Z | 8 | OR to F |
| 14 | ϕRG | 01110 | In. Addr. Y  Z | 8 | OR to G |
| 15 | ϕRH | 01111 | In. Addr. Y  Z | 8 | OR to H |
| 16 | WIJ | 1000 | Datum Y | 8 | Write Immediate to J |
| 17 | WIK | 1001 | Datum Y | 8 | Write Immediate to K |
| 18 | WIL | 1010 | Datum Y | 8 | Write Immediate to L |
| 19 | WIM | 1011 | Datum Y | 8 | Write Immediate to M |
| 20 | WIN | 1100 | Datum Y | 8 | Write Immediate to N |
| 21 | WIP | 1101 | Datum Y | 8 | Write Immediate to P |
| 22 | WIR | 1110 | Datum Y | 8 | Write Immediate to R |

TABLE I-continued

| Mnemonic | | Instruction Coding | Time μs | Name of Instruction |
|---|---|---|---|---|
| 23 | NϕD | 1111 (not defined) | 8 | No-Operation; Delete-Code |

The first 15 instructions listed are the same (F) instructions just mentioned for controlling the sequence control device 40. The operation field is represented by the five most significant bits, in the order F15–F11. Thus, at a given time it is one of those 16 binary numbers which appears on the instruction bus 5 and on line 75 leading to the sequence control device 40.

FIG. 3 illustrates the overall organization of the sequence control device 40. It should be observed that the sequence control device 40 is organized around a programmed memory 20 and includes a sequence counter 21, an input unit represented by input multiplexer 55, an output unit represented by output decode multiplexer 56, and some other generally known circuits which relate to typical functions such as jump, enable, inhibit, store, set, or reset, which, as well known in the art, are derived and executed in synchronization with a clock.

The memory 20, is distinct from the main memory within program memory module 4, and it contains 64 ($2^6$) words of 8 bits each, of which six bits have been reserved for the address field, and two bits for the operation field. This memory 20 is addressed by a sequence counter 21, the address count of which corresponds to the F14–F11 bits received on line 53 and the instructions so addressed constitute corresponding subroutines which are read out from the memory 20 and stored in a latch register 36 gated by a clock for transferring the stored instruction to the input multiplexer 55, or to the output decode multiplexer 56, or else (according to the definition of the two bits in the operation field) to a "go-to (F)" decode unit 57 or to a "UJ" (unconditional jump) decode unit 58.

Unit 57, once actuated, gates on line 18 a data selector 54, which in fact is a 2:1 multiplexer in relation to inputs 53 and 59, where input 53 carries the F14–F11 bits, and input 59 carries a jump address. The sequence counter 21 is gated by a load enable signal over line 60 to receive data from line 53, or from line 59, depending upon the selection made by the data selector 54 in response to a select signal on line 18. When load enable signal 60 is not present, clock signal 22 causes sequence counter 21 to be incremented. The address contained in sequence counter 21 is used to select the correponding instruction from memory 20. Reset of the sequence counter 21 occurs by a reset signal on line 23. However, the sequence counter of sequence control device 40 is also actuated by the F14–F11 bits appearing on line 53 which are derived from program memory module 4. Thus, sequence control device 40 is auxiliary to the controller 41, and in this role it performs subroutines between received successive input (F) commands. These subroutines may involve output commands requested to be generated, such as at the outputs 42–47 of the output decode multiplexer 56, and they are conditioned in accordance with some inputs, such as on lines 48–51. These input lines may be transferring an input datum internal to the subroutine itself or the input may be a datum derived from outside the controller module 7, as will be explained hereafter.

Sequence control device 40 also includes an inhibit logic unit 61 which, in response to tested conditions from the input multiplexer 55, may block via line 62 operation of each of the four units 55, 56, 57 and 58. The operation of the inhibit logic 61 is used to skip or not to skip the reset instruction of the sequence control device 40. The two bits of the operation field of the instruction generated on line 63, at any given time, may determine which of the four units 55–58 must be controlled, while the address field of the instruction will select the proper input or output within the controlled unit. More particularly, the instruction selects which input, or output, of the multiplexed unit 55, or 56, is to be operated on.

Before considering in more detail the particular structure and operation of the sequence control device 40 in relation to the controller unit 41 by reference to FIG. 4, some general considerations regarding the controller unit 41 are necessary and will be given by reference to FIG. 2.

The program counter 31 is normally incremented, as generally known, by a count signal over line 43, and such incrementation causes the successive instructions to be selected and read out from the program memory module 4. The selection of addresses by the program counter is effected along line 74, (and the program address bus), into the program memory module 4. From the program memory module 4, the selected instructions are derived (on the instruction bus) via line 75 before being stored into an instruction register 76 when latching occurs as controlled from line 47. When latched, the stored instruction (which has three fields (F), (Y), (Z), as shown on FIG. 2 and Table I) is transferred via lines 77, 88 and 78, which respectively correspond to the (F), (Y) and (Z) fields. The (Y) field via line 88 is gated by a data selector 79 when so selected by a select signal appearing on line 46. As a result the program counter 31 via line 81, assumes the (Y) address count. If the select signal on line 46 is the opposite, the data selector 79 gates the output of return register 82, via line 80, instead. The return register 82 stores the present address of the program counter 31 when latched on line 42, while the contents of the next address count in the program counter 31 are transferred via line 74.

Figure 4:
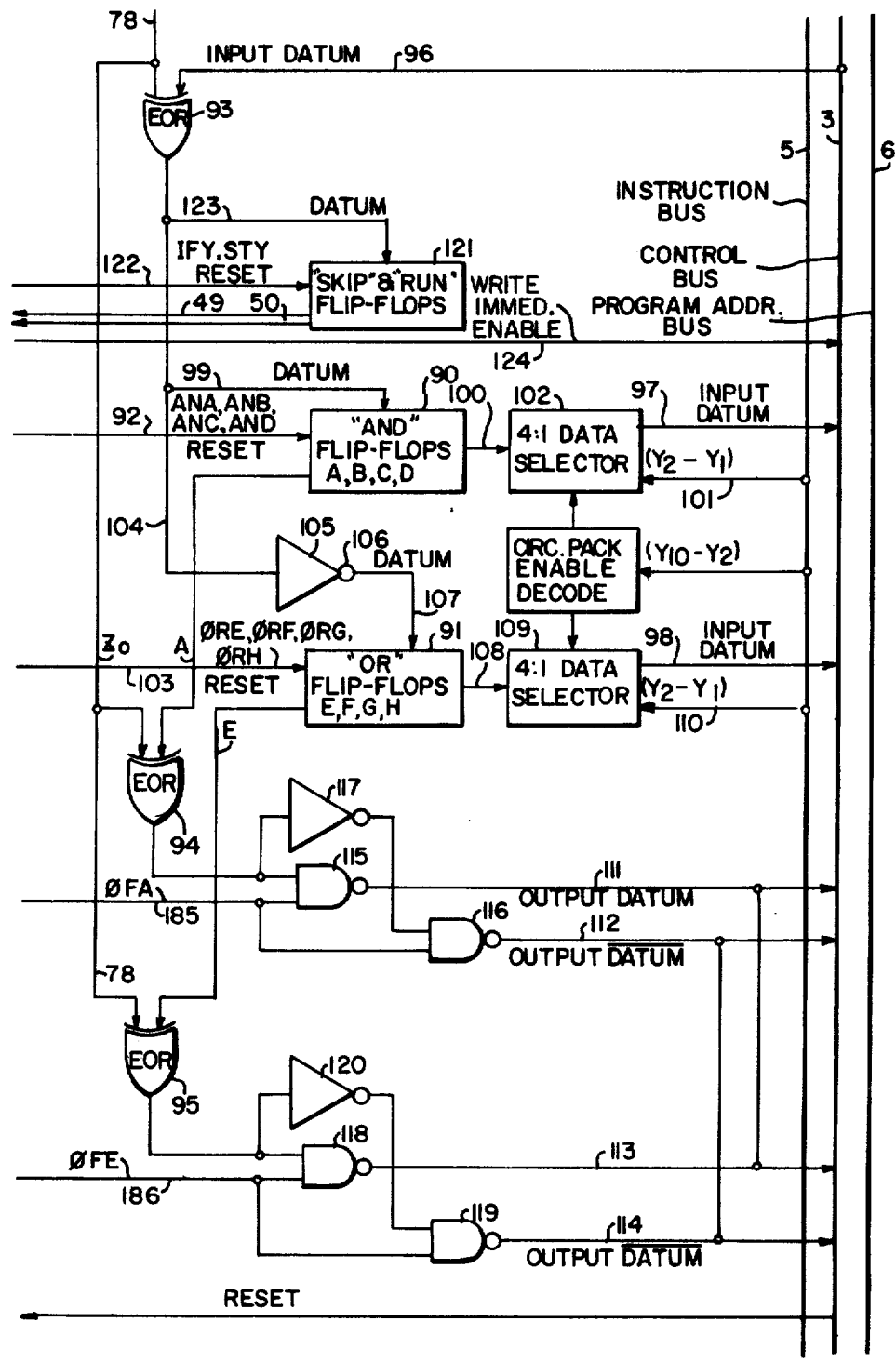
FIG. 4 illustrates the logic circuitry of the sequence control device used for the generation of input and output data by the controller module of FIG. 2 in accordance with the present invention.

On FIG. 4 are represented the circuits of the controller module 7 which are associated with each of the (4 to 15) sixteen instructions listed in Table I. These circuits are responsive to control conditioning and data signals such as the clock signals, the Z signal on line 78, the reset signals for the various circuits and signals representing several input data from the main bus system, in particular those derived on the control bus 3. The main operative elements within these circuits are the "AND" flip-flops A, B, C and D which are represented as a unit by block 90 and the "OR" flip-flops E, F, G and H which are represented as a unit by block 91. Block 90 is gated by instructions such as ANA, ANB, ANC, AND which are sent on lines 92. These may relate to one of the possible (F) commands from line 53 (shown in FIG. 3) which are defined as shown in TABLE I. Beside the operation field F, which is part of an instruction from the program memory 4, there is an address field Y and a field Z. As shown in Table I, Z is the least significant bit for instructions 4 through 15. In fact, Z is used as a control logic to generate the complement of any given datum. Z is derived on line 78 (see also FIG. 2), to be inputted into one of the exclusive OR devices 93, 94 and 95. The EOR device 93 also receives an input datum on line 96 from the control bus 3 which signal received on line 96 is an input datum which is supplied 1) from the controlled process, or a manual operator console, e.g., from the input module 9, 2) from the data memory module unit 10, or 3) from one of the blocks, 90, 91, on respective lines 97 and 98. Such input datum is transferred by the EOR device 93 as a datum which may be stored via line 99 into one of the "AND" flip-flop in accordance with the coded instruction ANA, ANB, ANC or AND, appearing on line 92. If the instruction corresponds for instance to an ANA code, (namely the ninth type of instruction in the list of Table I) then the input datum on line 96 will be applied into the "AND" flip-flop A, such that if this input datum is true then flip-flop A is unchanged, but if this input datum is false, the AND flip-flop A is changed to zero. Since flip-flop A had started out being a ONE in response to the RESET signal on line 103, logical AND operation occurs. At the output 100 of block 90, the datum in flip-flop A is gated by a data selector 102 as selected by the address bits $Y_2$-$Y_1$ derived on line 101 from the instruction bus 5. This results in an input datum being transmitted on line 97 to the control bus 3 and from there via line 96 to the controller module, if the instruction code so dictates, to permit sensing previous logic results during a current logic operation.

Similarly, the "OR" flip-flops E, F, G, H of block 91 may be operated upon when gated by signals provided on line 103 in accordance with the coded instructions $\phi$RE, $\phi$RF, $\phi$RG, or $\phi$RH. The inverted datum is generated from the EOR device 93 via line 104, inverting circuit 105 and 106 and line 107. This results in setting a corresponding one of the OR devices of block 91. The OR logic operation involves setting an OR flip-flop to a ONE if the input datum is true and no action if the input datum is false. A reset signal clears the flip-flop to a ZERO. The non-inverted datum is impressed on block 90 via line 99. The output 108 of block 91, as selected by data selector 109 in accordance with address bits $Y_2$-$Y_1$ (on line 110 from the instruction bus) is transmitted via line 98 to the control bus 3.

The A and E flip-flops (but it could be any of the others if needed) serve also the purpose of providing a first output datum on lines 111 and 113 and a second output datum on lines 112 and 114 which represent output commands in one and in the opposite state as shown in FIG. 4. This is the result of a combination of logic circuits including: NAND 115, for line 111 and inverter 117, coupled with NAND 116 for line 112 which are responsive to EOR device 94 and flip-flop A, NAND 118, for line 113 and inverter 120 coupled with NAND 119 for line 114 which are responsive to EOR device 95 and flip-flop E. The resulting two output data on lines 111 and 112 are passed on the control bus 3 to the data memory module 10 and the digital output module 8, as explained hereinafter.

The sequence control device 40 (FIG. 4) also includes "skip" and "run" flip-flops represented as a unit by block 121 which is gated by instructions IFY or STY (as defined in Table I) impressed on lines 122, thereby to transfer datum from line 123 from the EOR device 93, and generate skip, or run, signals on respective lines 49 and 50 which are inputs to the input multiplexer 55 of FIG. 3. Commands "Write Immediate Enable" may also be generated via line 24 which are performed as shown on the code list of Table I and are transferred to the control bus 3 and from there to the indicator module 11.

The operation of the sequence control device 40 as shown on FIGS. 3 and 4, will now be described by reference to FIGS. 5, 6 and 7 which represent flow charts (on FIG. 5, A through G on FIG. 6 and H through O on FIG. 9) characterizing several typical sequences of operation.

Figure 5:
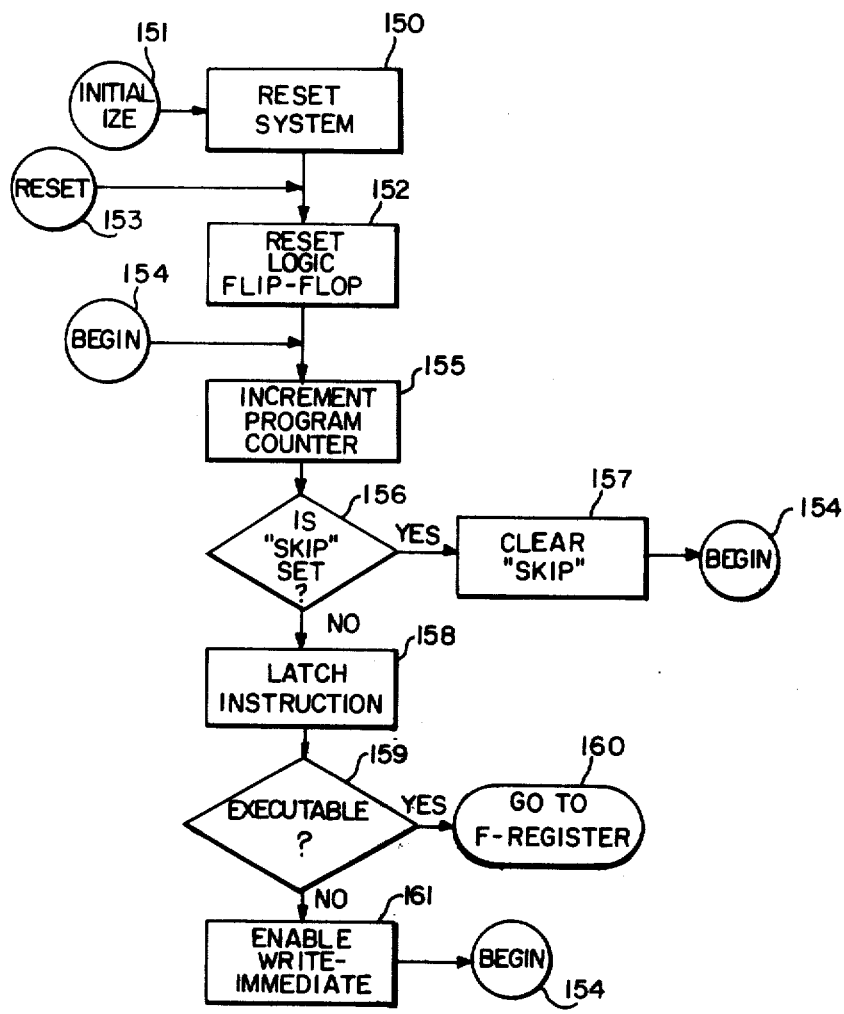
FIGS. 5, 6 and 7 are logic flow charts characterizing the operation of the sequence control device of FIGS. 3 and 4.

Referring to FIG. 5, before starting any control operation the system must have been prepared by placing all switches, all indicators, etc. in the zero state. This is accomplished at reset system step 150, in response to some initialize operation as indicated at 151. The next reset logic flip-flop step 152 provides resetting of the AND flip-flops A to D in block 90 and the OR flip-flops E to H in block 91. Step 153 indicates an unconditional jump operation to reset step 152 from the program flow chart shown on FIG. 6 as reset.

The sequence control apparatus having now been reset, the program advances to step 155 to increment program counter 31. At step 156 a check is made to see if a skip signal is provided on line 49, and if the skip logic element is set, the answer at step 156 is YES and the command clear slip at step 157 occurs, and the program goes back to begin at step 154 thus skipping the execution of the current instruction. If the answer at step 156 is NO, the program goes to block 158 and calls for a latch instruction operation, which places the reset instruction into the instruction register 76. A check is made at step 159 to see if this instruction can be executed (inhibit logic 61 permits execution of this instruction). If the answer is YES the program advances to step 160, which means that the go to F decode circuit 57 (FIG. 3) will generate a select signal on line 18 such that data selector 54 passes the F instruction from line 53 to the sequence counter 21. This selected F instruction determines which of the flow chart programs of FIGS. 6 and 7 is now followed, as will be later explained in greater detail. If the answer is NO at step 159, then at step 161, line 124 of FIG. 4 is used to transmit a write immediate enable signal to the indicator module 11 and the program returns through being 154 to step 155.

Figure 6:
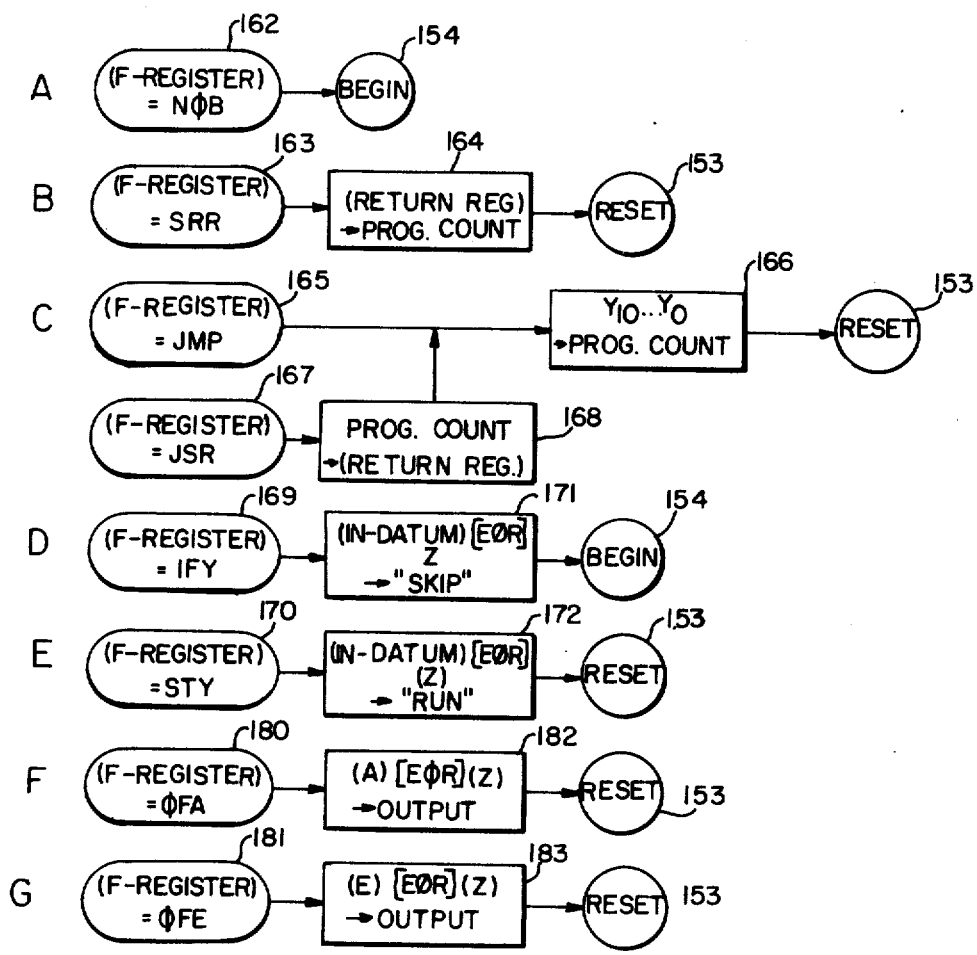
Figure 7:
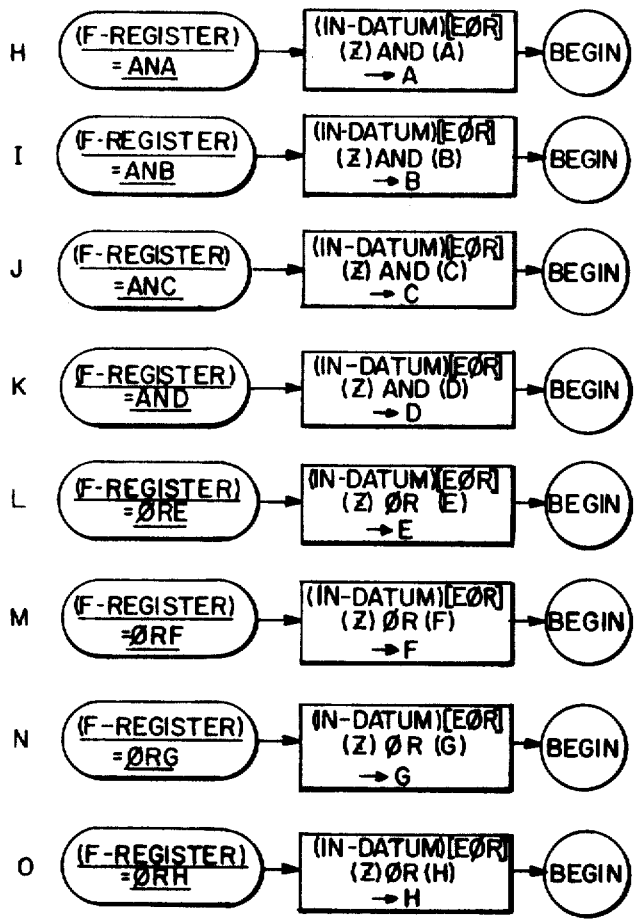

FIGS. 6 and 7 are flow charts representing execution of the respective first sixteen coded F instructions, listed in Table 1, each under the assumption that the particular instruction code has been stored in as contents of the F-Register, or instruction register 76, as expressed by (F-Register) within the oval on the left side of each flow chart. Also, as generally accepted in the art, the parentheses shown means the contents of whatever lies between therein, while the arrow represented indicates where those contents are to be loaded into, or "entered into". It is believed that a person skilled in the art will understand the disclosure of flow charts A through O in FIGS. 6 and 7. It will be sufficient here only to consider some typical examples.

Flow chart A on FIG. 6 expresses by its step 162 that the operation field (F) of the instruction in the F-register as read-out from the program memory 4, is N$\phi$B (not defined in Table I), meaning "No Operation," or "Blank". When this has been detected there is a return to "Begin" at 154. Unprogrammed memory locations normally appear as NϕB instructions, and are thus skipped.

In the flow chart B, the oval 163 indicates that the F-register contains the instruction SRR (Sub-Routine Return). The operation F step 164 is performed by transferring the contents of the return register 82 into the program counter 31. This operation will be better understood after some explanation regarding the coordination of the F-instruction in actual operation. The explanations will be given by reference to FIGS. 3 and 4. After step 164, there is a retunr to "Reset" 153 of FIG. 5.

Flow chart C relates at step 165 to an instruction JMP (jump) stored in the F-register. In such case, the address $(Y_{10} \ldots Y_0)$ is transferred to the program counter at step 166 and the program is thereafter returned to reset 153. However, should the instruction be JSR (jump to sub-routine) as shown at step 167, then first the contents of the program counter 31 is transferred to the Return Register 82 (FIG. 3) as shown at step 168 and then at step 166 is performed as a jump.

Flow charts D and E represent "Skip" and "Run", alternatives in response to commands IFY at step 169 and STY at step 170, respectively. As shown on FIG. 4, an input datum received from the control bus 3 on line 96 processed by exclusive OR 93 and the resulting datum on line 123 is stored in one of the "Skip" and "Run" flip-flops of block 121, in accordance with the instructions IFY or STY received on line 122. This is expressed by the respective steps 171 and 172 in FIG. 6. Instruction IFY results in conditionally setting the skip flip-flop. This results in performing the next instruction in the program. Instruction STY is similarly performed by setting the RUN flip-flop.

Flow charts F and G represent execution of an output command with respect to flip-flop A, or flip-flop E, when an instruction ϕFA, or ϕFE, appears on line 185, or 186 (FIG. 4). This is indicated by steps 180 and 181 and by steps 182 and 183 on the flow charts F and G of FIG. 6.

FIG. 7 represents additional flow charts in relation to the operation of AND flip-flops A, B, C and D of block 90 of FIG. 4 and in relation to OR flip-flops E, F, G and H of block 91.

To summarize (F) instructions:

NϕB: No-operation, blank — No charges are created anywhere in the system, except to take the next instruction.

SRR: Sub-routine return — The contents of the Return Register are placed in the Program Counter; The Return Register is not disturbed — Flip-flops A–D are reset to ONE; flip-flops E–H are reset to ZERO.

JMP: Jump, unconditionally — The contents of the address field of this instruction are placed into the Program Counter; the instruction is not disturbed — Flip-Flops A–D are reset to ONE: flip-flops E–H are reset to ZERO.

JSR: Uump to subroutine — The contents of the Program Counter are placed into the Return Register; then the contents of the address field of this JSR instruction are placed into the Program Counter; the instruction is not disturbed — Flip-flops A–D are reset to ONE; flip-flops E–H are reset to ZERO.

IFY: If $(Y) \neq Z$, skip next instruction; otherwise execute next instruction — The flip-flops are not disturbed. Y is taken to be an input location.

STY: Stop if $(Y)=Z$; otherwise proceed — The flip-flops are not disturbed. Y is taken to be an input location.

ϕFA, ϕFE: Output from A, Output from E. The content of flip-flop A (alternatively flip-flop E) is exclusive — OR processed with instruction bit $z$, and the result placed on output Y — Then flip-flops A-D are reset to ONE, flip-flops E–H are reset to ZERO.

ANA, ANB, ANC, AND: AND to A, AND to B, AND to C, AND to D. The content of input Y is exclusive — OR processed with instruction bit $z$, and the result is AND processed with the contents of flip-flop A (alternatively flip-flop B, flip-flop C, or flip-flop D. This latter result is stored into the same flip-flop. The remaining seven flip-flops, including three of those named above, as well as flip-flops E–H, are not disturbed.

ϕRE, ϕRF, ϕRG, ϕRH: ϕR to E, ϕR to F, ϕR to G, ϕR to H. The content of input Y is exclusive — OR processed with instruction bit z, then the result is OR processed with the contents of flip-flop G, or flip-flop H); this latter result is deposited into the same flip-flop. The remaining seven flip-flops, including three of those named above as well as flip-flops A–D are not disturbed.

WIJ, WIK, . . . WIR: Write immediate to J, Write immediate to K, . . . Write Immediate to R — The content of the address field Y is placed into Register J (alternatively Register K, . . . Register R), if that register exists; otherwise, no operation occurs. The flip-flops are not disturbed.

NϕD: No-operation, "Delete" code - No changes are created anywhere in the system except to take the next instruction.

B. THE PROGRAM MEMORY MODULE

The aforementioned 16 basic instructions have been stored into the memory of the program memory module 4. The word length is 16 bits without parity. Referring to FIG. 9, the memory itself is shown having up to eight cards. Each card is comprised of up to sixteen read only memory integrated circuit package pairs of 32 instructions each. Thus each card contains up to 512 words. The memory is so arranged that four cards in a group 301 are used for a base program of up to 2048 instruction capacity variable in 32 instructions increments and fully addressable to instructions SRR, JMP, and JSR, these being the only instructions which could cause a jump, e.g. a change in the order of addressing the instructions as stored. In contrast, the other four cards in a group 300 are reserved for a "high-security" program of instructions, and these do not contain any jump instruction (thus neither SRR, JMP, nor JSR) except at the end of the "high-security" program so that addressing of the high-security program will occur always in the same order, by incrementation. The capacity of the high-security zone of the memory is up to 2048 instructions. The high-security and the base programs stored in the ROM correspond to the groups 300 and 301 of the ROM as shown in FIGS. 8 and 9.

The program memory module 4 comprises a plurality of module units, or cards, each organized as an elementary array of 16 bits by up to 512 words as shown in FIG. 9. These elementary units are supplied with all the necessary interface devices, address decoders, and the like. Preferably they are made up of Read-Only Memory (ROM) integrated circuit packages. Sockets are provided on each modular unit to accommodate up to 32 such packages of the type known at the present type in the market as IM 5600. A 3-bit binary "module number", or address characterizing switch 311 shown in FIG. 10, is included on each unit. In order to minimize system power dissipation, the program memory module units are provided with individual circuit package power switching, so that only the particular circuit package pair being accessed at a given time be effectively under power.

Figure 8:
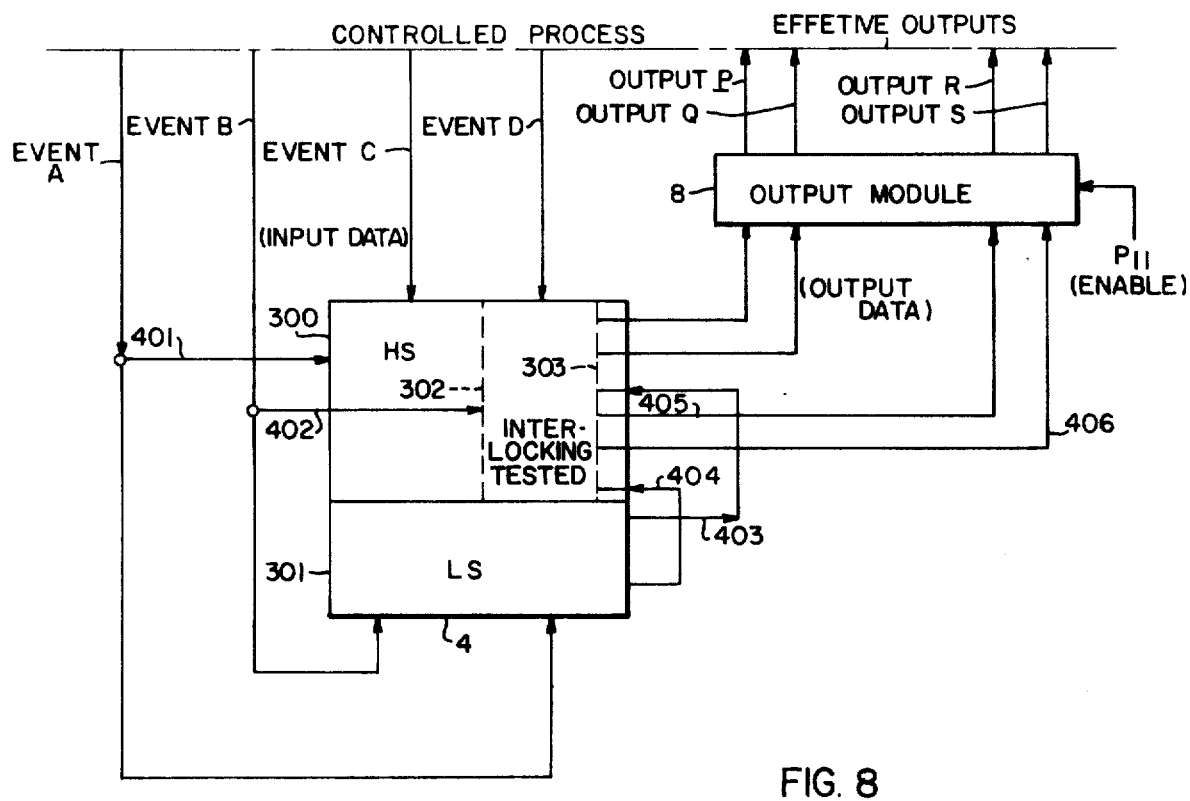
FIG. 8 illustrates the role of the program memory according to the present invention in relation to critical process input conditions and requested process commands.
Figure 9:
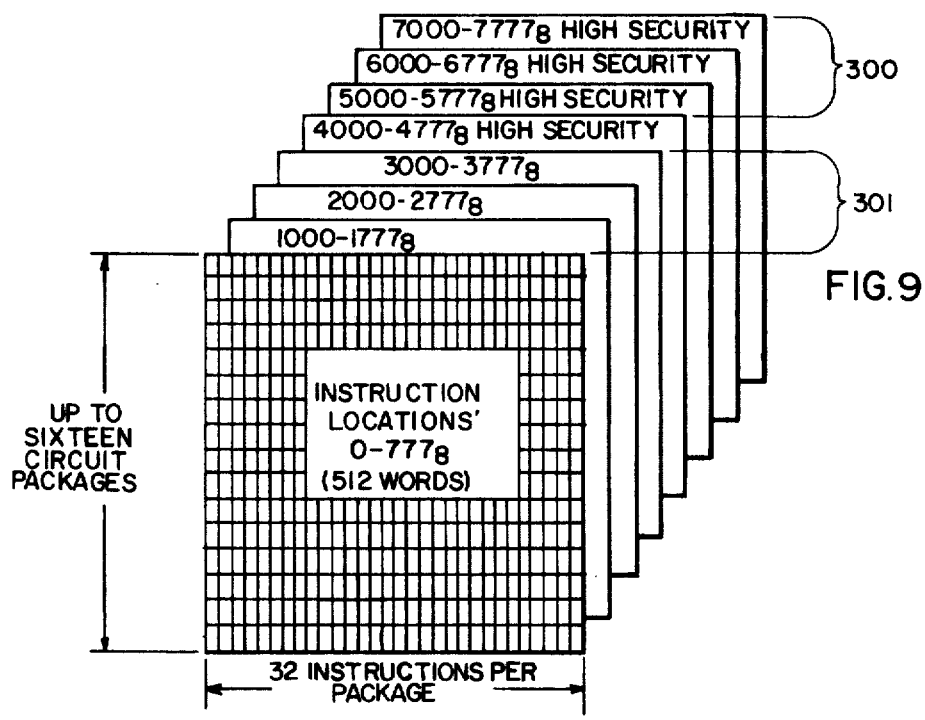
FIG. 9 illustrates eight program memory cards used in the program memory module according to the present invention.
Figure 10:
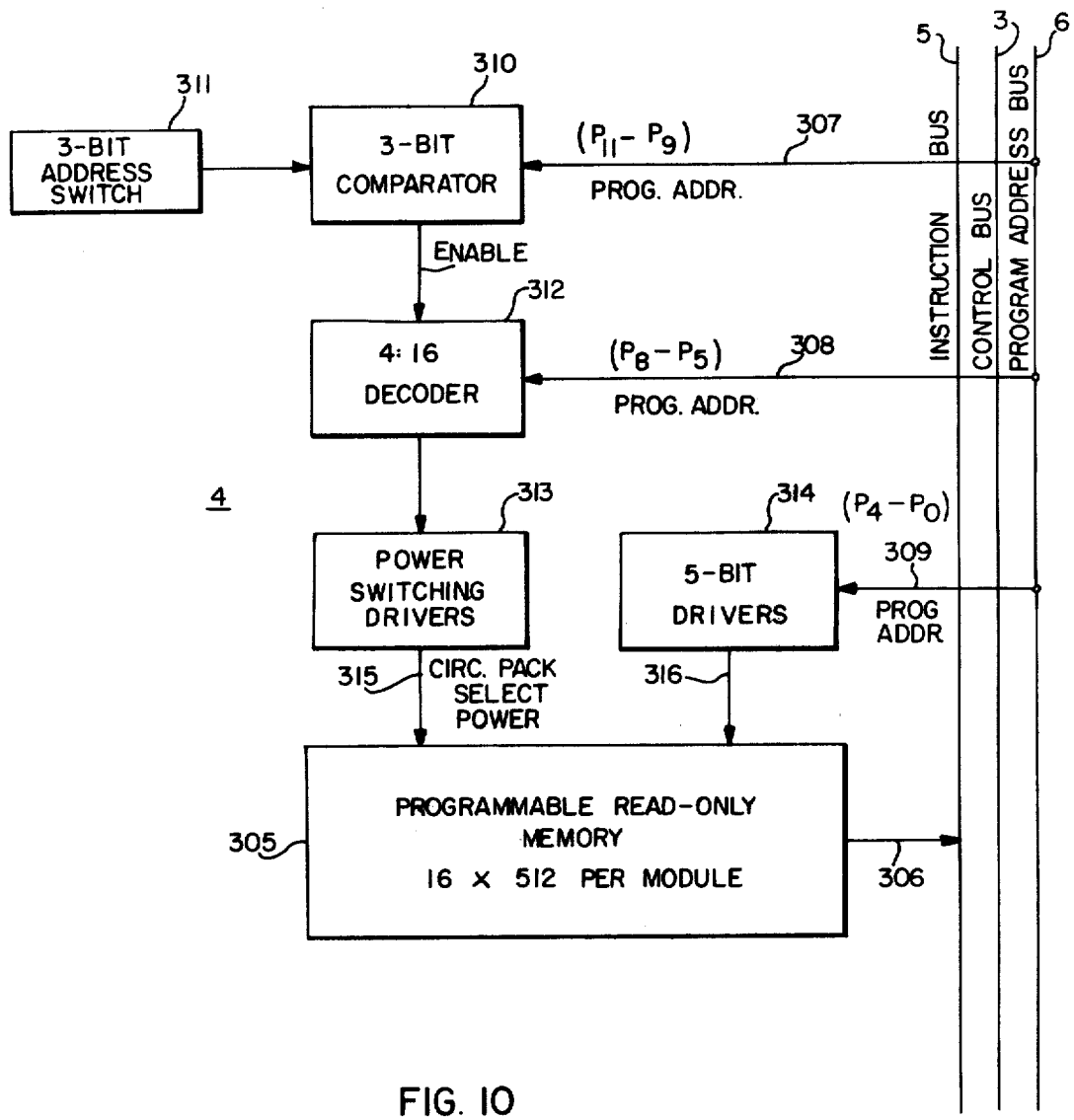
FIG. 10 shows the internal organization of a portion of the program memory module of FIGS. 1 and 9.

As shown in FIGS. 8 and 9, the memory comprises two groups of cards or zones 300 and 301 which have stored therein two respective sets of instructions. Zone 300 will be referred to as a high-security zone of HS zone and zone 301 will be referred to as a low-security zone or LS zone. While incrementation by the program counter proceeds from one set of instructions to the other in a monotonically increasing way, the high-security program operation is fixed so that no jump does exist in the instructions of the HS zone 300 except at the end of the "high-security" program. Accordingly, the instructions of the high-security zone are always addressed from the location of lowest order toward the location of highest order. On the other hand, while the LS zone 301 will be provided with jump instructions, as the degree of sophistication of sequential control may require, in no way shall an address count enter the HS zone otherwise than through the location of lowest order therein. More specifically, if a jump is required in the LS zone 301, the go-to address will not enter the HS zone 300. For entering the HS zone 300 from the LS zone 301, the program operation provides only one way, namely: through the regular incrementation from the highest location in the LS zone 301, which will be naturally followed by an address of lowest order in the HS zone 300. Shifting of the sequence control apparatus from low-security operation to high-security operation, as explained hereinafter, is achieved under a SCAN program which on a time basis recurrently calls for the high-security program, stored in the program memory module. However, this is only one possible mode of initiating operation of the sequence control apparatus under the HS zone 300 of the program memory module. Another way of initiating high-security operation could be by providing a jump to subroutine (JRS on Table I) instruction after an output has been requested from the LS zone 301. Such jump to subroutine would be addressed to the last instruction location of the LS zone 301, so that, automatically, by incrementation from instruction location 2047 in the LS zone 301 the sequence control apparatus becomes operative in accordance with instruction location 2048, which is the first instruction location within the HS zone 300. As a result of such JSR instruction, operation is automatically transferred from the LS zone 301 to the HS zone 300. Such a situation will be considered hereinafter. However, it should be realized at this point of the description that while the preferred embodiment requires any entry into the HS zone to occur after the last location in the LS zone has been reached, this is not a requirement under the broad concept of the invention and other means which are readily conceived by the man skilled in the computer art can be used to achieve the same result, namely, a compulsory entry into the HS zone from the LS zone of the memory, and counting the addresses of the HS zone only from the first to the last.

The high-security zone contains a set of instructions which have been carefully written in order to so condition the controller 41 and sequence control device 40 that the required conditions for a critical output be always met before outputting to the process. As a result, it is assured that when the machine or process is controlled under instructions read out from the high-security zone, there cannot be any wrong operation such as would, for instance, wreck the machinery, or endanger the life of an operator. Any control operation which could be critical if improperly performed will have been taken in consideration and the wrongful occurrence is prevented by a careful selection of the instructions stored. In order to insure maximum safety, provision is made for preventing unauthorized tampering of the high-security portion of the program memory module once the instructions have been stored. A sealable cover plate can be provided if desired to block access to the installed memory circuit packages and the associated address switch.

This high-security set of instructions relates to a limited number of sequence control operations. The remaining required sequence control operations must be handled by a more general program involving routine instructions and necessarily including jumps. The latter program is established as a second set of instructions by the user in consideration of the particular application of the purchased OEM equipment. For these reasons, this second set of instructions may be regarded as a low-security program by comparison with the high-security set of instructions.

The controller establishes in response to the high-security zone instructions a definite sequence which includes effective interlocking between sequenced process events. Interlocking ensures that an output command will not be generated which would not come in the proper sequence, or unless enabled by predetermined input conditions. The controller module 7 will in fact inherently test critical events against each other during the sequence performed in accordance with the high-security program.

A second characteristic of operation of the controller module 7 consists in forcing any output command requested in accordance with an instruction from the low-security zone, which is critical to the operation of the controlled process to be outputted only after testing by the sequence of instructions defined in the high-security zone. The importance of these two characteristics of sequence control operation will appear more clearly from the discussion of the operation of the controller module 7 given hereinafter in relation to instructions from the above two zones of the program memory module 4.

Referring to FIG. 10, the internal organization of the program memory module 4 is shown in relation to one of the eight cards forming the memory. One Programmable Read-Only Memory card 305 is shown. As an illustration of one practical application that has been made of the sequence control apparatus herein described, four cards provide 2047 locations for the base program, or low-security zone 301, four other cards provide 2048 locations for the instruction of the high-security zone 300. Thus, when counting the addresses from zero in the low-security zone the last location therein is 2047, and the first location of the high-security memory zone contains instruction 2048. The word length is 16 bits.

In response to an address count $P_{11}-P_9$ received from the program address bus 6 on line 307 bits $P_{11}-P_9$ are used as an input to a three-bit comparator 310, the comparison being made with the output of a three-bit address characterizing switch 311, which can be manually operated so as to assign any of eight addresses to this module. The Enable output of comparator 310 is thus true, whenever this module is selected. Bits $P_8-P_5$ are received on line 308 to effect a selection through the 4:16 decoder 312, together with the Enable output from comparator 310. As a result of the selection by the 4:16 decoder 312, selected power switching drivers are actuated within power switching drivers circuit 313. This results via line 315 in the selection of an integrated circuit package chip-pair and activation with power, within the card 305. A five-bit decoder-driver circuit 314 is also actuated by bits $P_4-P_0$ from line 309 to select drivers therein and define via line 310 the particular binary address within the card 305. The resulting output instruction appears on line 306.

C. — Operation of the Controller Module In Conjunction With The Program Memory Module Consideration of the mode of operation of the sequence control device 40 and the controller 41 is now in order by reference to FIGS. 2, 3 and 4.

It is assumed first that a full instruction including an operation field (F), an address field (Y) and a (Z) field is received from the instruction bus 5 on line 75. In response to a latch signal on line 47 of FIG. 2 from the sequence control device 40 the received instruction is stored into the instruction register 76. The (Z) portion is impressed on line 78 leading to the exclusive OR devices 93, 94 and 95 of FIG. 4. The (F) portion which contains the active statements and determines operation of the sequence control device 40 is impressed on line 77, as shown in FIG. 3, and divides into line 48 (for the F15 bit), and line 53 for the input to the sequence control device 40 (for the other bits).

Normal operation is by incrementation of the program counter 31 (step 155 on FIG. 5) so that successive (F) statements appear on line 75 (FIG. 2) and are stored in the instruction register 76 one after the other. Latching on line 47 is in accordance with step 158 of FIG. 5, and storage into the F-register, at step 160 of FIG. 5, occurs from line 75 within instruction register 76 of FIG. 2. The program counter 31 is incremented from line 43 (FIG. 2). Thus, normally the instructions are read in successive order as a result of the program counter 31 setting address counts in numerical order.

The address count of the program counter 31 includes 12 bits $P_{11}-P_0$, which match the 12-bit diode address of the program memory 4. On the other hand, an instruction in the register 76 is a 16-bit instruction as shown in Table I and for instructions 4 to 15 the five most significant bits $F_{15}-F_{11}$ are the operation field, the 11 bits $Y_{10}-Y_0$ are the address field and the one bit Z, is the least significant bit, with the address field (Y) being one bit narrower than the address count in the program counter. Bits $P_{10}-P_0$, in the program counter are matched with the ten bits of the (Y) field when the (Y) address has been preset into the program counter. As to the most significant bit $P_{11}$ it plays a very important role.

When the instruction to be selected by the program counter is located in the high-security zone 300, the 12-bit address from the program counter 31 always has a ONE as the most significant bit. If the address corresponds to a location in the low-security zone 301, the most significant bit from the program 31 is always ZERO. Thus, whenever in the program counter the address count is incremented from zero up, selection occurs through locations with the low-security zone 301 and eventually all digits $P_{10}-P_0$ will become a ONE, and for the next count, the carry position will cause the most significant bit $P_{11}$ to become a ONE, with a zero at all other positions. When this happens, the program counter will have in fact selected the first location in the high-security zone 300 as the next location. In other words, $P_{11}$ is a coded characteristic which determines where the selection of instructions is to be made as between the two memory zones. Since the high-security zone can not be responsive to any jump instruction, the two sets of instructions will always follow each other in such a way that the succession of instructions through the high-security zone will be initiated by incrementation from the last location in the low-security zone 301 to the first location in the high-security zone 300. Furthermore, should jump instructions have been stored in the high-security zone, the first such jump instruction which is encountered will cause an immediate reversion to the low-security zone. In this fashion jump instructions are made ineffective in the high-security zone, and therefore are precluded. To this effect bit $P_{11}$ is used as follows: Assuming there is a signal on line 44 (FIG. 2) to preset the programs counter 31, this preset command is so connected within the Program counter that it establishes a ground 200 at the position of the most significant bit $P_{11}$ thus creating a ZERO. This means that whenever the sequence control device 40 asks for a preset, $P_{11}$ automatically becomes a ZERO. Therefore, the eleven-bit preset address received from either the return register 82, or from the (Y) address in the instruction register 76, depending upon the state of the data selector 79 set by line 46, will be included with the twelfth bit which is $P_{11} = 0$, indicating the the GO-TO address selected by line 44 lies in the low-security memory zone. In other words, should for any reason the high-security zone contain an instruction asking for a jump, or should a jump be requested by the sequence control device 40 while performing instructions for the high-security zone, the preset signal on line 44 will automatically take the operation out of the high-security zone. This constitutes a very valuable protective measure against any inadvertent jump when operating through the high-security zone. This is consistent with the philosophy adopted in the preferred embodiment which is to have jump operation effected only for instructions read-out from the low-security zone. It is recalled, referring to the list of instructions in Table I, that the only types of instructions which could cause a jump to occur are SRR (Sub-Routine Return), JMP (Jump unconditionally) and JSR (Jump to Subroutine). The peculiarities of these three instructions will appear from the explanations herein regarding operation of the sequence control device 40 in conjunction with the controller 41.

Figure 11:
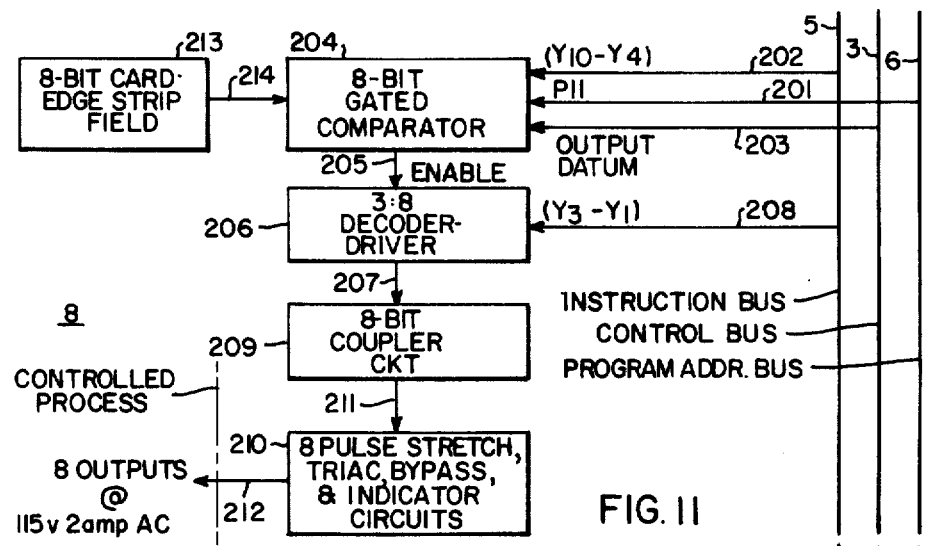
FIG. 11 shows the digital output module of FIG. 1.

A third important use of the most significant bit $P_{11}$ in the address count will appear from a consideration of the digital output module 8 shown in FIG. 11. The address count appears with all the digits $P_{11}-P_0$ on line 74 (FIG. 2), and is transferred onto the program address bus 6. The bus conductor affected to the most significant bit $P_{11}$ is connected as an input 201 to the digital output module 8 (FIG. 11). From the instruction bus, bits $Y_{10}$ to $Y_4$ are transferred on lines 202 to the digital output module 8. The control bus 3 also impresses an output datum on line 203. The input line 201 gates an eight-bit comparator 204 which, once gated, generates an enable signal on line 205, which is transferred by a decoder driver 206. The latter which is a multiplex circuit (3:8) has an output 207 which is selected by a three-bit address $Y_3$–$Y_1$ appearing on lines 208 from the instruction bus 5. The eight-bit output from line 207 is applied to an eight-bit coupler circuit 209 and a power signal is generated in response thereto by an output command circuit 210 which comprises eight-pulse stretch, triac, by-pass and indicator circuits. These eight outputs on line 212 supply to the controlled process commands which are typically 115 volts, 2 amperes AC. An important consideration is that the most significant bit $P_{11}$ which appears on line 201 will prevent gating of the 8-bit comparator 204 whenever $P_{11} = 0$, which occurs when an output command would result while the controller 41 is responding to (F) instructions derived from the low-security zone 301. Conversely, the eight-bit comparator 204 is gated by line 201 when $P_{11} = 1$, which occurs when the controller module 7 is operating under instructions from the high-security zone 300. In other words, the digital output module in inhibited from generating any output command on line 212 to the controlled process in response to an output datum on line 203, unless the instruction being executed is coming from the high-security zone. The digital output module also includes an address characterizing switch 213 which, through line 214, permits the operator to determine the provision of the enable signal on line 205 of the comparator 204.

Figure 12:
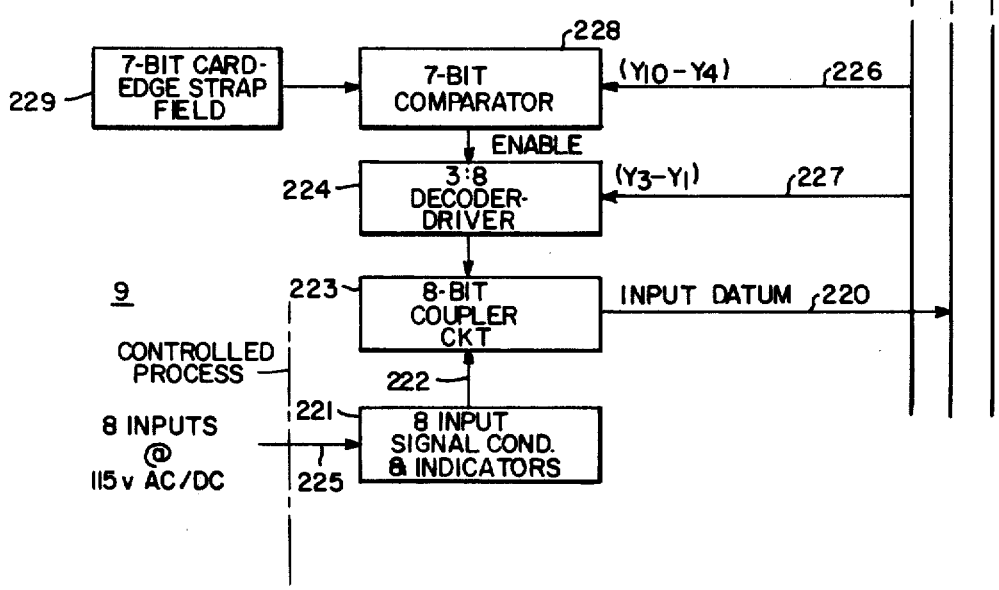
FIG. 12 shows the digital input module of FIG. 1.

Referring now to the digital input module 9, shown in FIG. 12, the generation of an input datum on line 220 to be impressed on the control bus 3 is obtained in response to an input condition sensed from the controlled process and received on an eight-input line 225. These inputs may be signals translating OFF and ON conditions of limit switches, valves, indicators, etc. These signals are converted by an input circuit 221 into signals which are suitable for handling by the system. These signals appear on line 222 as inputs to an eight-bit coupler 223 which generates the input datum as selected by the decoder-driver 224 when enabled in accordance with two kinds of input selections: $Y_{10}$–$Y_4$ on line 226 and $Y_3$–$Y_1$ on line 227, which are taken from the instruction bus 5. The first seven bits are tested by the seven-bit comparator 228 against an address characterizing switch 229 which is manually operated in order to alter the response (or lack of response) to the binary number $Y_{10}$–$Y_4$ received on line 226. When the address of the particular card has been recognized by matching, the enable signal is generated. The three other bits $Y_3$–$Y_1$ are impressed on the decoder-driver 224, which is multiplexed in the ratio 3:8. As a result, the eight-bit coupler circuit 223 selects, among the eight-inputs from line 222, the input which should carry an input datum on line 220 to the control bus 3.

Figure 13:
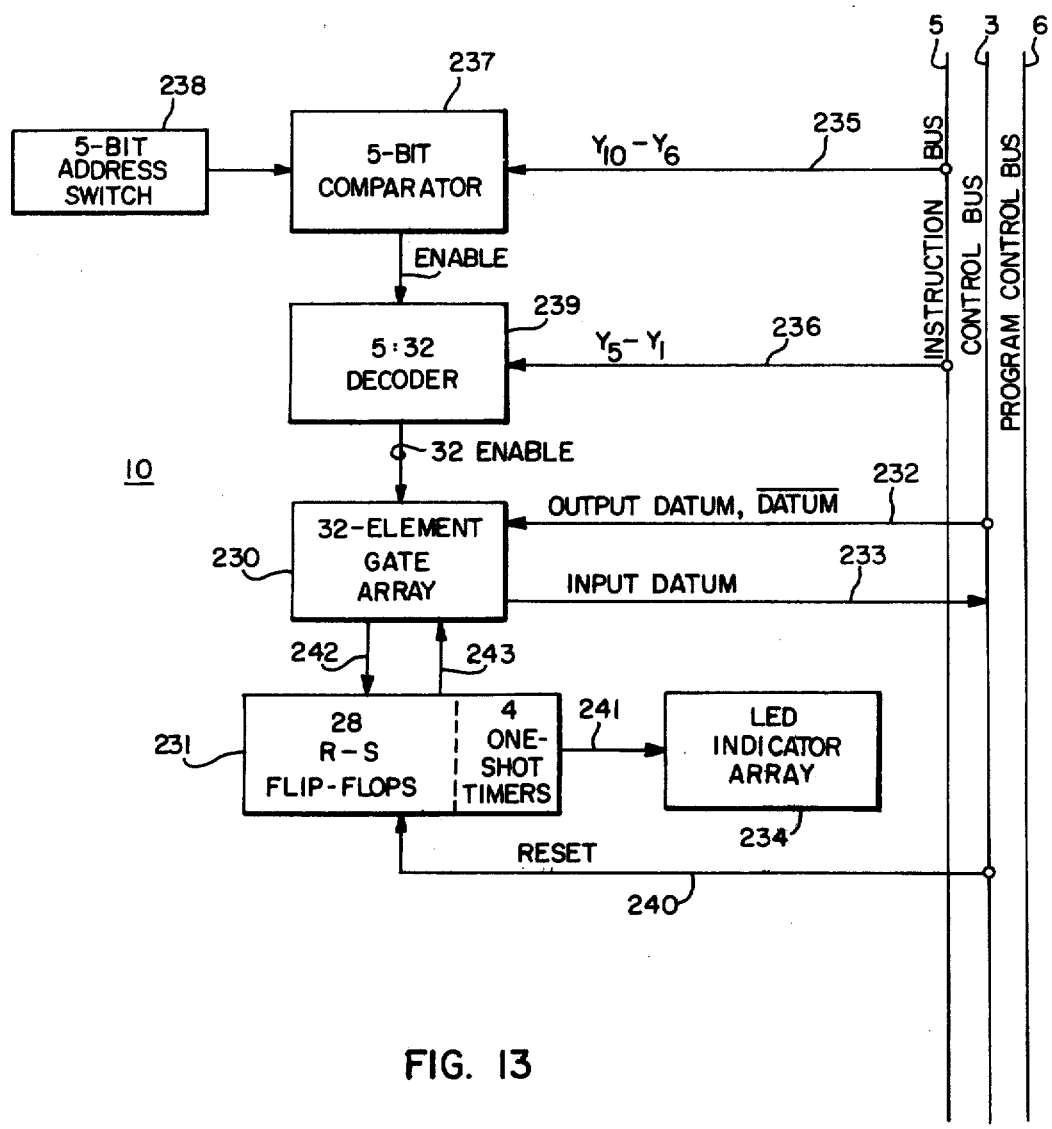
FIG. 13 shows the data memory and delay module of FIG. 1.

Referring now to the data memory and delay module 10 shown on FIG. 13, the main circuit is a data memory 231 of one-bit word-length. This circuit contains 28 flip-flops and four one-shot timers. The four one-shot timers behave like flip-flops, except that they reset themselves after expiration of the corresponding delay. The delays are typically 5, 25, 125 and 625 milliseconds. The data memory 231 determines activation within the light-emitting diode (LED) indicator array 234 thereby to display the states of the flip-flops. Reset of the flip-flops is effected from line 240 in response to the controller module 7. The flip-flops and timers are actuated via line 242 from a 32-element gate array 230, which in turns responds to signals via line 243 from the data memory 231. Thus, an output datum or a datum (complement) is received from the control bus 3 on line 232 and stored into the data memory 231. Conversely, the datum stored in the data memory 231 can be transferred via line 243 to the control bus as an input datum impressed on line 233. The selection of the elements in the array 230 and the associated bits of the data memory is effected on a 5:32 decoder 239 by five bits of the address $Y_5$–$Y_1$ on line 236 when enabled by matching of five bits of the address $Y_{10}$–$Y_6$ on line 235 with the address characterizing switch 238 in a five-bit comparator 237.

The capacity of the data memory 231 is of 1024 bits in 32-bit increments. This capacity is intended to accommodate the total memory locations and input locations, as well as the total memory location and output locations, since the data memory, the inputs, and the outputs are all sharing the same sequence of addresses. Pulse duration is provided within each 32-bit data memory increment. Of the 32 bits, four are one-shot pulsers having 5, 25, 125 and 625 millisecond retriggerable delays, respectively. LED indicators are associated with each bit of data memory.

Operation of the controller module 7 in conjunction with the program memory 4 can now be considered in the light of the explanations given regarding the digital output module 8, the digital input module 9 and the data memory and delay module 10. For this purpose, reference is made again to FIGS. 2 to 4.

The sequence control device 40 is operative for performing subroutines in relation to (F) instructions received from the program memory module 4 via line 75 and instruction register 76. A new (F) instruction is presented, after a subroutine is performed and the associated sequence operation executed, either with respect to input multiplexer 55 or with respect to output decode multiplexer 56. At the end of the subroutine, "GO-TO" decode circuit 57 may generate a "select" signal on line 18. As a result data selector 54 will make the sequence counter 21 responsive to the (F) instruction appearing on lines 77 and 53. The corresponding subroutine sequence stored in the memory 20 will be performed. Instead of selecting an (F) instruction, the signal on line 18 might be causing a jump to occur directly from the memory 20 along line 59. The F15 bit which appears on line 48 is used to separate normal control operations by the system from other kinds of operations required, or useful, and it should be understood that under normal control operation F15 is in the proper state. The Z bit derived on line 78 from the instruction register 76 (FIGS. 2 and 4) is employed to change the logic of a test, or an output, for instance from true to false, from ON to OFF, from YES to NO, from presence to absence. In such a case, all that is necessary is to operate on the complement ($\overline{DATUM}$) of the treated DATUM. It is the function of the Z bit to cause such inversion in the logic used when it is appearing on line 78 (FIGS. 2 and 4).

Referring to FIG. 2, it is assumed first that the (F) instruction stored in the instruction register 76 belongs to the low-security zone. Therefore $P_{11}$ is a zero in the program counter. If this is the case, owing to the presence of a zero on line 201 (FIG. 11) the output module 8 is prevented from generating any output command on line 212, since comparator circuit 204 is disabled and so are the circuits 206, 209 and 210. Assuming that the (F) instruction in the instruction register 76 is for an output command, for instance $\phi$FA (shown in FIG. 4) for an output from flip-flop A, this instruction will appear on line 185. If the proper conditions, which are inherently set to be tested are satisfied, i.e. if (A) = (Z), the NAND device 115 will generate the output datum true on line 111, and NAND device 116 will generate output datum false on line 112. If (A) ≠ (Z), the opposite output signals will occur. Still no effective output datum will be generated by the digital output module 8 in response to the signal appearing on line 203 (FIG. 11) since $P_{11} = 0$ on line 201. Nevertheless, the output datum will also appear on line 232 (FIG. 13) as an input to the data memory module 10. This datum may be stored in one of the 28 flip-flops of the data memory 231, depending upon the accompanying address.

It will be shown now how the system operates in order to fulfill the request for an output datum in accordance with the (F) instruction from the low-security zone 301 of the program memory module 4. A Jump to Sub-Routine (JSR, Table I) will appear as the next instruction of the main program (low-security zone). The sequence control device 40 will provide a latch command on line 42 (FIG. 2) so that the address count corresponding to the unfulfilled (F) output command is stored into the return register (82) and the contents of the address field of the new instruction (JSR) is placed into the program counter 31 under a preset command on line 44 from the sequence control device 40, and in addition a reset signal on lines 92 and 103 causes flip-flops A–D to be reset to a ONE, and flip-flops E–H to be reset to zero. Since the output datum which had been tentatively set by flip-flop A is now stored in the data memory delay module 10, this leaves the instruction undisturbed. The (Y) address on such Jump to Sub-Routine (JSR) instruction is so selected that all the counts $P_{10}-P_0$ become a ONE. Therefore, the program counter 31 instead of incrementing to the next location within the low-security zone will now select the highest location therein. The sequence control apparatus is ready to leave the low-security zone 301 and to enter the high-security zone 300 at the first location thereof, after all the ONE's have by incrementation been changed to a zero, except the carry which will have changed the most significant digit from a zero to a ONE, $P_{11}$ is now equal to ONE. From there on, operation will be in accordance with instructions from the high-security zone and by incrementation only since there is no jump and, should there be a jump instruction as previously seen, the system would automatically revert to low-security zone operation on account of a preset signal on line 44 causing grounding of the most significant bit $P_{11}$ on line 200. Of those high-security zone instructions there will be one for the same output command which has been requested by the low-security zone. The output will be provided by the high-security zone if it is permitted under the testing conditions specifically provided for by the high-security zone instructions. Assuming the output command is permitted, the stored output datum derived as an input datum from data memory 231 (FIG. 13) will be transferred to line 111 of FIG. 4 under the $\phi$FA instruction from line 185 just as intended before. The output datum is in turn transferred by bus 3 to the digital output module 8 via line 203, (FIG. 11). However since $P_{11}$ is equal to ONE on line 201 nothing prevents the digital output module 8 from generating an output command on line 212, as selected in accordance with address bits $Y_{10}-Y_4$.

It should be observed here that at no time are output datum and input datum exchanged by direct transfer. They must pass through the instruction-controlled circuits of FIG. 4. The input datum received on line 96 was, in the example just given, coming from the data memory 231 where it was in fact a stored output datum. An input datum may also be generated on lines 97, or 98, in response to selection of one of the flip-flops A to H. But it will never be an output datum received from any of lines 111 to 114, since in such instance, either the output command is executed, if in the high-security zone and permitted, or it is stored in the data memory 23 (FIG. 13) if not permitted from the high-security zone or if prohibited from the low-security zone, until more favorable conditions make it permissible.

D — The Interlocking Arrangement

Logic coordination of all operations in relation to individual instruction bits within sequence control device 40 is effected in accordance with the instructions listed by the programmer in the high-security zone 300, in the low-security zone 301 of the main memory, or in the memory 20. These will result in the flip-flops contained in blocks 121, 90, 91 being successively set and reset when manipulating data. Broadly, sequential control of a machine or process will result from the generation of actual output commands thereto and the sensing of actual input conditions therefrom. It is intended that these commands occur in a predetermined order and only when well defined process requirements are satisfied. These requirements are represented by a particular input condition which appears on input line 225 of FIG. 12. An important feature of the control operation according to the present invention resides in the way any requested output command is tested against such actual input conditions and against the predetermined and desired order of the operational steps to be taken. This is achieved by interlocking inputs and outputs in order to obtain the desired result in any circumstance.

FIG. 8 shows diagrammatically how interlocking insures that a safe succession of actual output commands such as P to S is outputted to the controlled machine or process in response to input conditions such as events A to D sensed in relation to the controlled machine or process. These events and output commands represent or determine the status of a switch relay, a valve, or any bistable device physically related to an actual operative condition of the controlled machine or process. The input conditions may as well be a suitable indicator or any well known bistable device providing logic statements such as true or false, present or absent, yes or no. Events A to D in FIG. 8 are signals supplied by an input module and the output commands P to S are generated by an output module 8.

For the purpose of illustration, input signals representing process events A to D or output command signals P to S to the process are shown in FIG. 8 carried by lines leading to memory zones 300 and 301 of the program memory module 4. Some of those lines are shown reaching an indicated region between boundary lines 302 and 303 of the high-security zone representative of the interlocking function, for the purpose of illustrating which input events and which output commands are in practice interlocked. Thus, input event D is interlocked with output command P, input event B and output command R are interlocked, and output commands P and Q are interlocked. Output commands Q, R and S are interlocked. It is noted that outputs Q and S are requested over lines 403 and 404 in response to instructions from the low-security zone 301, and therefore are outputs requested during low-security operation of the controller module. Lines 403 and 404 reach the boundary line 303 within the high-security zone, indicating interlocking, and thereafter two new output command signals emerge on lines 405, 406 which carry permitted output commands Q and S respectively, if testing has been permissive.

Figure 14:
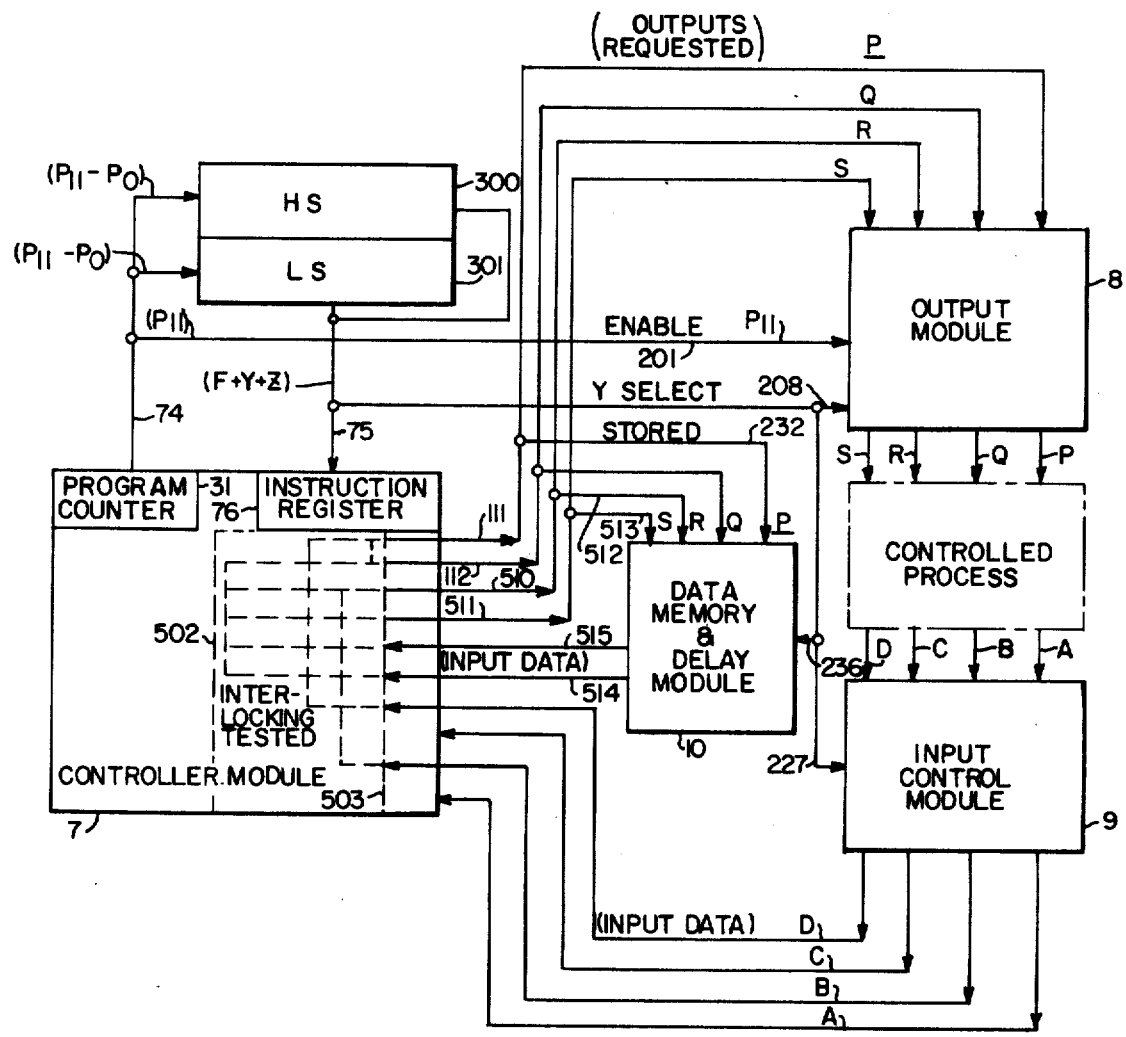
FIG. 14 is a block representation of the various modules of the sequence control system in relation to the interlocking operation here provided.

While FIG. 8 represents interlocking as seen from the view point of the high-security zone, FIG. 14 represents the same interlocking operation as seen from the view point of the controller module 7. The controller module 7 is shown operatively connected with the HS memory zone 300 and LS memory zone 301 of the program memory module 4, with the data memory module 10, the output module 8 and the input module 9. The program counter 31 and the instruction register 76 are identified within controller module 7. The connections between modules have been identified by a reference numeral already found in FIGS. 2, 3, 4 and 8 wherever appropriate. When an output signal such as P, Q, R, S, is reached, it appears on lines 111, 112, 113 or 114 shown in FIG. 4 and if permitted by the interlocking test indicated by the region between boundary lines 502 and 503 within the controller module 7 of FIG. 14, effective control of the output module 8 occurs for the particular permitted output. Assuming, as in FIG. 8, that outputs R and S are requested under instructions from the low-security zone 301, FIG. 14 shows that requested outputs R and S indicated on lines 510 and 511 when coming under instructions from the low-security zone 301, are stored into the data memory and delay module 10 via lines 512 and 513 from which they are transferred again as input data via lines 514 and 515 for testing whether an actual output from output module 8 as enabled by $P_{11}$ on line 200, can be generated.

In order to provide a specific illustration in relation to the high-security sequence operation of a main sequencer portion of the here described apparatus, it is assumed that the main sequencer is so programmed that three output commands Q, R and S are requested only in one of two modes, with Mode I corresponding to a predetermined succession Q, R, S of the requested outputs, and Mode II corresponding to the inverse order of succession S, R and Q. The high-security sequencer portion imposes the additional condition that not more than two of these requested output commands can be applied to the controlled machine or process at any given time, such that all three of the requested outputs Q, R and S will not be provided at the same time, under either mode of operation.

Referring to the flow chart shown in FIG. 15, a low-security main sequencer program called "INIT" is used to reset each logical device in the sequence control apparatus to a state placing the apparatus in condition to start by first turning ON requested output Q, after turning OFF the two other requested outputs R and S. Thus the flow chart shows after the start of the program, step 601 turn OFF requested R, step 602 turn OFF requested S and step 603 turn ON requested Q.

Step 604 calls the next program, which is the "SCAN" program, stored in the low-security zone of memory 4.

The SCAN program flow chart is shown in FIG. 16. At step 700 a decision is made whether the predetermined 5 millisecond time period is done (or expired); if it is, the program goes to step 701 and restarts another 5 millisecond time period as determined by one of the timers in data memory 231 of FIG. 13. At step 702 the programs calls the HIGH-SECURITY program shown in FIG. 18. If the 5 millisecond time period is not done at step 700, at step 703 a decision is made whether the predetermined 625 millisecond time period is done; if it is, the program goes to step 704 and restarts another 625 millisecond time period as determined by one of the timers in data menory 231 of FIG. 13. At step 705 the program calls the SEQUENCE ADVANCE program shown in FIG. 17. If the 625 millisecond time period is not done a step 703, at step 706 a decision is made whether a STOP operation is requested; and if it is, at step 707 the program provides a STOP operation by looping back to the step 706 to again determine if a STOP operation is requested. This loop operation is repeated for as long as the STOP operation is requested and if effect provides a time delay for permitting the operation of the TRIAC output devices shown as block 210 in FIG. 11 to terminate conducting and in this way no longer provide a corresponding output signal to the controlled machine or process. After the STOP request has been removed, the program will go to step 708 to determine if INITIALIZE is requested, and if it is, at step 609 the INIT program of FIG. 15 is called; and if not, the program loops back to step 700.

Figure 17:
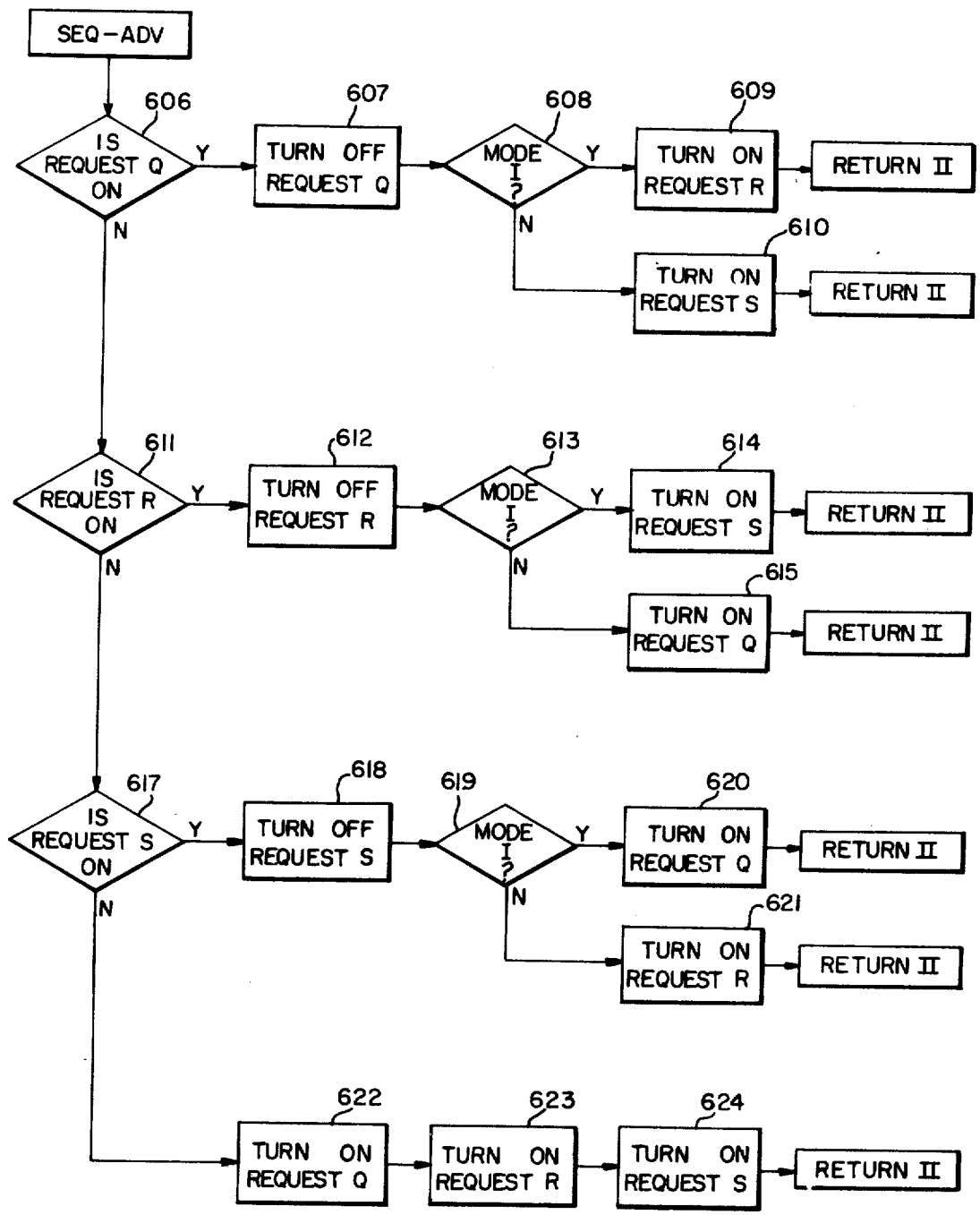
FIG. 17 shows a flow chart of an illustrative low-security main program SEQUENCE ADVANCE operation.

In FIG. 17 the SEQUENCE ADVANCE program, called at step 705 of FIG. 16, is set forth. At step 606 a decision is made whether Request Q is turned ON, and if it is, at step 607 Request Q is turned OFF. At step 608 a decision is made wheter Mode I operation is selected, and if it is, at step 609 the Request R is turned ON and the program then returns to the SCAN program to step 706. At step 608 if Mode I is not selected, at step 610 the Request S is turned ON, and the program thens goes to step 706 of the SCAN program. If the Request Q is not turned ON at step 606, at step 611 a decision is made whether Request R is turne ON; and if it is, at step 612 Request R is turned OFF. At step 613 a decision is made wheter Mode I is selected, and if it is, at step 614 the Request S is turned ON and the program then returns to step 706 of the SCAN program. If Mode I is not selected at step 613, at step 615 the Request Q is turned ON and the program then returns to step 706 of the SCAN program. If Request R is not turned ON at step 611, the program goes to step 617 to decide whether Request S is turned ON; and if so, at step 618 the Request S is turned OFF. At step 619, a check is made to see if Mode I is selected, and if so, at step 620 the Request Q is turned ON and the program then returns to step 706 of FIG. 16. If mode I is not selected at step 619, at step 621 the Request R is turned ON and the program returns to step 706 of FIG. 16. At step 617 if the Request S is not turned ON, this indicates an unwanted condition of operation so at step 622 the Request Q is turned ON, at step 623 the Request R is turned ON and at step 624 the Request S is turned ON; which is also an unwanted condition of operation, but the HIGH-SECURITY program of FIG. 18 is operative to prevent more than one of these requested output commands to be turned ON at the same time. The program then returns to step 706 of FIG. 16.

In FIG. 18 the high-security program logic operation is set forth for providing no more than two output commands Q, R, S to the controlled machine or process, as called at step 702 of the SCAN program shown in FIG. 16. The logic AND 802 is responsive to the Request Q signal on line 800 and to an input condition A on line 801 and a third input signal on line 803 to be later explained for determining the provision of output Q signal to the output module 8 on line 804. Similarly, AND 808 is responsive to Request R on line 810 and to a third input signal on line 811 to be later explained for determining the provision of output R on line 812 to the output module 8. Also, AND 815 is responsive to Request S signal on line 816, to input condition signal C on line 817 and a third input signal to be later explained on line 818 for determining the provision of output signal S on line 819 to the output module 8. The output signal from the logic AND 808 is applied in conjunction with the output signal from the logic AND 815 to the NAND 825 for establishing on line 803 the third input signal to AND 802. Similarly, the outut signal from the logic AND 802 is applied in conjunction with the output signal from the AND 815 to the NAND 826 for establishing on line 811 the third input signal to AND 808. Also, the output signal from the logic AND 802 is applied in conjunction with the output signal from the AND 808 to the NAND 827 for establishing on line 818 the third input signal to AND 815. In this manner no more than two output signals Q, R and S will be permitted by the high-security program, and are further determined by input conditions signals A, B and C, respectively.

In the drawings there are shown in FIGS. 19 to 22 instruction program listings that have been prepared to control the operation of a machine or process such as an industrial process in accordance with the here disclosed sequence control apparatus and method. The instruction program listings are written in an illustrative machine language of a sequence control apparatus manufactured by Westinghouse Electric Corporation for real time process control applications. This instruction program listing is included to provide an illustration of one suitable embodiment of the present control apparatus and method that has been prepared for purpose of illustration, and this instruction program listing at the present time has not been extensively debugged through the course of practical operation for the real time control of an industrial process operation. It is well known by persons skilled in the art that some real time process control application programs contain some bugs or minor errors, and it is within the skill of such persons and takes varying periods of actual operation time to identify and correct the more critical of these bugs.

E. GENERAL CONSIDERATIONS

Thusly it should be noted that the present invention provides for:

1. output interlocking operation requiring selected outputs to be operable only by program instructions accessed from a high-security region in the main program memory;
2. indentification of this high-security region through operation of a built-in portion; i.e. in a 4096 word memory, among which locations 2048 through 4095 inclusive are designated as high-security;
3. rigid control over the sequence of program execution within the high-security region by preventing jump or program branch instructions from calling up any instruction from the high-security region, with the consequence that straight-line or branchless execution, always begin at location 2048, is provided.

In the control of the operation of various processes and machines, there may arise a need for a sequence controller which is appreciably less costly than a minicomputer, which provides a high degree of intrinsic interlocking security, and retains much of the flexibility of a general purpose digital computer. Such a sequence controller should be suitable for low-cost, high-volume manufacture, and is intended for a moderately sophisticated OEM-customer market place.

The apparatus is here disclosed as a free-standing sequence controller, with the architecture, packaging, instruction sets, and the various hardware interfaces being specified in a highly modular bit-oriented free-standing device capable of first-level sequential and interlock control over a wide variety of machines or processes.

The sequence controller according to the present invention is organized around an internal multi-conductor bus consisting of 42 separate parallel conductors which are accessible to each controller module. Signaling along the bus is directed in open-loop fashion by the control module, with pulse durations and delays included to be compatible with a predetermined bus length. Position of modules along this bus is completely free, there being no slot-to-address correlation whatever. The controller module provides for execution of 15 instructions which are concerned with both sequencing and interlocking. Typically, the instructions run in about 9 microseconds each. Provision is made on the controller module for single-instructions step, or free-run modes, of operation. Eight additional instructions, providing for program output to an optional array of 12 bit registers (or alternatively, "no-operation" execution for non-opted registers) are accommodated, as a singular class operation so far as the controller mode is concerned. Power obtained from the 115v ac line, is converted to regulated 5.25 volt DC for distribution along the bus. Although small systems may be operated from a single supply, it is permissible to parallel two or more supply modules on the same bus so as to achieve larger supply currents, as a result of built-in load sharing capability. Outage detection is provided in each supply module, such that the RESET line in the bus is "grounded" by a mercury-wetted contact unless the bus voltage exceeds 4.8 volts DC. Such detection is based upon bus voltage, not internal supply module voltages, hence it is not in conflict with redundant supply schemes.

In order to minimize system power dissipation, the program memory modules are provided with circuit package power switching, such that only the particular circuit package pair currently being accessed is powered. The data memory is separate from the program memory, and is packaged 32 bits per module. The high four bits of each data memory module are one shot (retriggerable) multivibrators having delays of 5, 25, 125, and 625 milliseconds respectively. Each bit is individually addressable for both "output" and "input" operations. All bits are forced to "ZERO" whenever the RESET line in the bus is at "ground". A five bit binary "module number" or address characterizing switch is included on each module, and 32 light emitting diode indicators continuously display data memory contents.

Input-Outputs modules are provided to interface with the bus for handling eight bit digital input and output. Neon indicators are required to display the states of the 115v AC external signals.

As to switch characterization (namely, the act or effect of specifying which reference address will be applied to a given group of signals or words) this is done with coded switches or coded jumpers straps, and is accomplished by strapping within the external wiring plug. An interlock is provided so tht output types may optionally be signaled only by instructions located above program memory location 2047.

Figure 23:
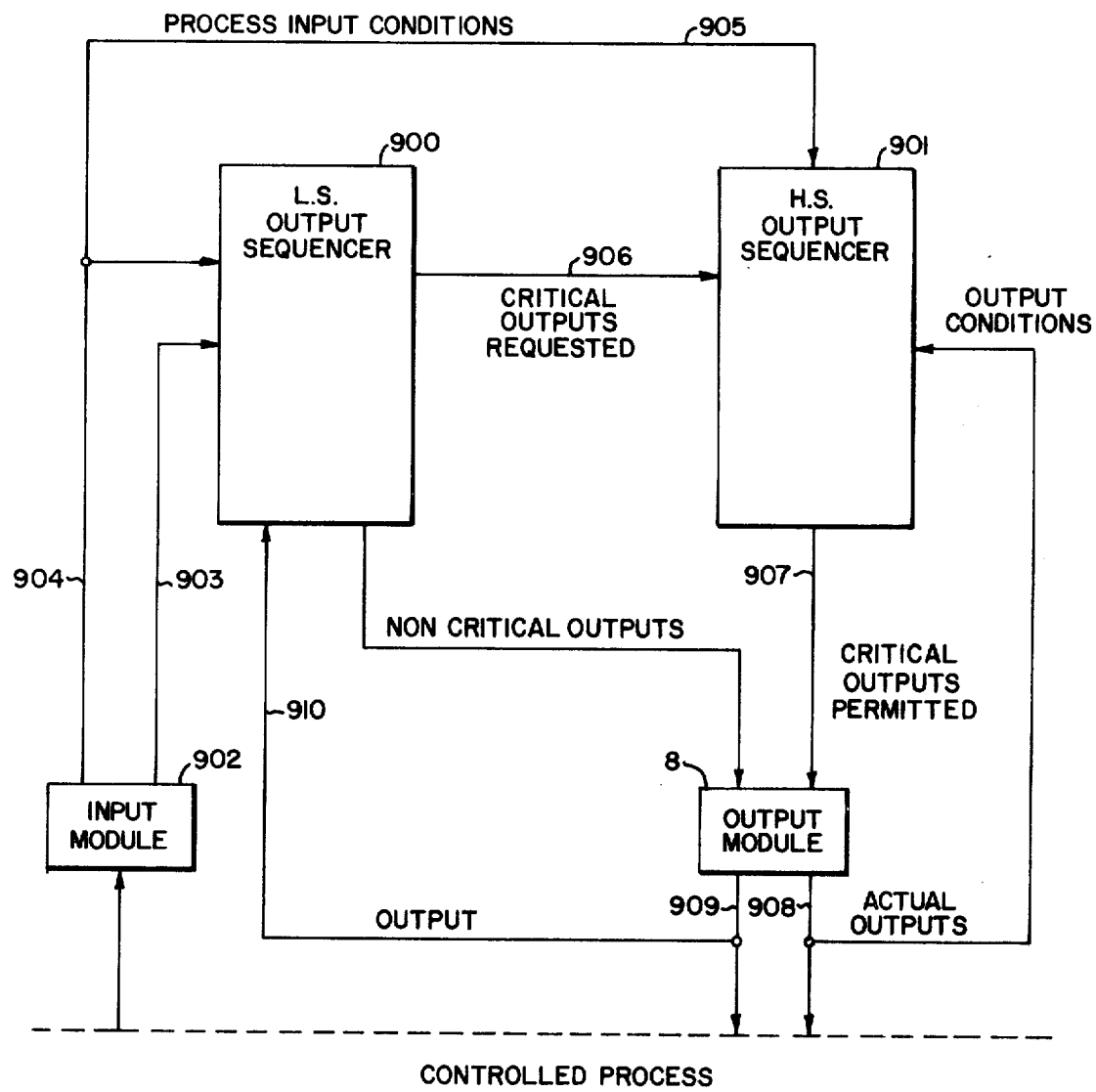
FIG. 23 is a block diagram depicting most generally the apparatus according to the present invention.

The description of the sequence controller apparatus according to the present invention is best summarized by the block diagram of FIG. 23 depicting a programmed low-security (LS) output sequencer 900 and a programmed high-security (HS) output sequencer 901 each responding to input signals including at least signals representative of controlled process operation and each generating output signals which are characteristic of process conditions desired or actually to be performed. Thus, the input module 9 is conditioned via line 902 to generate signals representing process input conditions on lines 903 and 904 which are inputted into the LS output sequencer 900. Some of these signals may also be inputted via line 905 into the HS output sequencer 901. LS output sequencer 900 does not distinguish between critical and non-critical process conditions of operation. However, at its output, signals representing outputs which are critical to the controlled process, are definitely passed to the HS output sequencer 901, and only thereto, via lines 906. The HS output sequencer is thus conditioned to generate output signals in accordance with such signals on line 906 which represent critical output requested. Sequencer 901 may also respond to process input conditions as signified by signals on line 905 from the input module 902, as previously mentioned. So conditioned, sequencer 901 generates, in accordance with its internal programmed logic, control signals via line 907 which, when so derived, represent critical outputs which are permitted and inputted into the output module 8. For more generality, it is assumed that sequencer 900 generates signals representing non-critical outputs for the controlled process which are also, but without passing throught the high-security sequencer 901, directly fed into the output module 8. For more generality also, it is assumed that some of the control signals generated by the output module 8 on lines 908 and 909 to effectively control the process, are used as signals representing process input condition and thus fed to the LS output sequencer 900, via line 910, or the HS output sequencer 901, via line 911. For the same reason it is not excluded that certain data taken from the data memory be used as signals representing input conditions for testing within the HS output sequencer 901, thus implying additional connections between the two sequencers 900 and 901.

In the preferred embodiment a sequence control apparatus has been described comprising a controller module including a program counter addressing either the low-security zone or the high-security zone of a program memory module, depending upon the state of a selecting bit 8. It should be understood that modification can be made without being outside the scope of the present invention.

For instance, two program memories could be used, one for each of the low-security and high-security modes of operation. Also, instead of one program counter 31 selecting one of these two program memories, two program counters could be used within the controller 41, for the respective modes of operation, the program counter associated with the highsecurity mode of operation being operative only by incrementation, e.g. with no respect signal such as on line 44 (FIG. 2) being present at all time.

More generally, the sequence control apparatus according to the present invention, may be regarded as actually comprising two sequence controllers, one for low-security, the second for high-security operation. With such understanding the output module 8 is made responsive only to outputs generated by the second sequence controller, but not to requested outputs from the first sequence controller. Indeed, the invention is concerned mainly with critical output commands, e.g. with such commands to the controlled process or machine, which cannot be applied without teaching a number of critical conditions. As illustrative of such critical conditions could be the level of speed sensed on the process, the activation of a safety switch, a certain pushbutton depressed by the operator, the fulfillment of an operative step resulting from a prior output command, the persistence or disappearing of a certain output command. This does not prevent in a more general sense outputting from the first, or low-security, sequencer whenever a requested output relates to an output command which is not so critical. Therefore, to that extent the output module might be made responsive to certain outputs requested from the low-security sequence controller. Only selected outputs from the first sequence controller would then be tested through the second or high-security, controller to determine whether they can become output commands from the output module 8.

The two sequence controllers so distinguished may also be considered as operable either serially or in parallel. When used in parallel, a common output module such as 8 as in FIG. 2, would be enabled by a comparator comparing the output sequential pattern of the first sequence controller with the output sequential pattern of the second sequence controller, enabling of the output module depending upon a matching between the two sequential patterns during sequence control. When used in series, the output module is operatively conditioned only by the second sequence controller, or high-security controller. Requirements due are matched within the second sequence controller against the requested outputs of the first, or low-security controller, as well as against other selected conditions, including sensed process operative conditions from the input module, such as 11 on FIG. 1. In all such instances, the second sequence controller may be completely encased in a sealed protective box in order to forbid physical access to the high-security program memory.

In this fashion, the present invention provides for a dichotomy between program instructions which relate to the design and basic characteristics of operation of a controlled machine or process, considered of a general purpose nature and most critical in terms of risk and strictness of requirements, on the one hand, and program instructions more concerned with the particular application made by the user of the controlled machine or process, which are left to the discretion of the buyer and user of the OEM sequence control apparatus according to the present invention.

I claim:
1. In a control system operative with an industrial process and including a plurality of process condition sensors associated with process controlling devices, the combination of:
   first memory means having stored therein a plurality of first output governing functions of input data representing the status of said process condition sensors for providing first mode output data corresponding to predetermined ones of said first output governing functions and pertaining to each of said process controlling devices;
   second memory means having stored herein a single second output governing function of input data representing the status of selected process condition sensors and of said first mode output data for providing second mode output data pertaining to each of said process controlling devices;
   timing means for generating a synchronizing signal;
   counter means controlled by said synchronizing signal and operative with said first and second memory means
   sequencer means operative with said first memory means when said counter means is in a first mode to generate said first mode output data in relation to said first memory means, and operative with said second memory means when in a second mode to generate said second mode output data in relation to said second memory means;
   said sequencer means in the first mode selecting a predetermined corresponding first set of input data from said sensors when operative with a particular one of said first output governing functions and establishing a corresponding said first mode output datum in relation to a particular one of said controlling devices;
   said sequencer means in the second mode selecting a second set of input data from said sensors and said first mode output datum and establishing a corresponding said second mode output datum in relation to said particular one of said controlling devices; and
   output means inhibited by said sequencer means in the first mode and enabled by said sequencer means in the second mode for activating said particular one of said controlling devices.

2. The control system of claim 1 with said first memory means including branching governing functions logically related to said first output governing functions;
   said sequencer means being operative in said first mode to select one of said first output governing functions in response to one of said branching governing functions.

3. The control system of claim 1 further including data memory means for storing said first mode output data, said sequencer means being operative in said second mode with said input data and with said stored first mode output data.

4. The control system of claim 1 with said counter means being binary counter means, with the operation of said sequencer means in first mode being initiated by one state of the most significant digital bit in said binary counter means, and with the operation of said sequencer means in the second mode being initiated by the other state of said most significant digital bit in said binary counter means.

5. The control system of claim 4 with the operation of said output means being inhibited by said most significant digital bit being in said one state, and being enabled by said most significant digital bit being in said other state.

6. The control system of claim 1 with said first mode output data being generated and successively stored during operation of said sequencer means in said first mode under control of said timing means in relation to a number of said first output governing functions;
   said second mode output data being generated in relation to said stored first mode output data during operation of said sequencer means in said second mode under control of said timing means.

* * * * *